United States Patent [19]

Ogletree et al.

[11] Patent Number: 5,596,684
[45] Date of Patent: Jan. 21, 1997

[54] ANTI-ALIASING APPARATUS AND METHOD USING FAST SCAN-LINE MEMORY MAPPING FOR SAMPLING PIXEL PATTERNS

[75] Inventors: Thomas M. Ogletree, Austin; Michael J. Dougherty, Houston, both of Tex.

[73] Assignee: Compaq Computer Corporation, Houston, Tex.

[21] Appl. No.: 344,549

[22] Filed: Nov. 23, 1994

[51] Int. Cl.$^6$ .................................................. G06K 15/00
[52] U.S. Cl. ........................ 395/109; 395/115; 358/447; 358/298; 345/136; 382/305
[58] Field of Search ................................. 395/109, 101, 395/115–117, 107, 111, 164–166; 358/347, 447, 455, 456, 298, 444, 445, 404; 382/305, 269; 345/136, 185–191, 201, 137

[56] References Cited

U.S. PATENT DOCUMENTS

| | | | |
|---|---|---|---|
| 4,847,641 | 7/1989 | Tung | 347/131 |
| 5,005,139 | 4/1991 | Tung | 395/101 |
| 5,222,214 | 6/1993 | Kobayashi | 395/164 |
| 5,249,242 | 9/1993 | Hanson et al. | 358/447 |
| 5,327,260 | 7/1994 | Shimomae et al. | 358/448 |

Primary Examiner—Edward L. Coles, Sr.
Assistant Examiner—Tracy M. Legree
Attorney, Agent, or Firm—Vinson & Elkins L.L.P.

[57] ABSTRACT

A method processes a plurality of bits stored in a first memory and representing an image to be printed by reproducing the bits in a fast scan direction. The method includes the step of reading a plurality of groups from the first memory into a second memory, wherein each of the groups comprises a number of bits greater than one bit and is stored in the second memory in the fast scan direction, and wherein each group is read one group at a time. Further, the method includes copying a predetermined number of bits from each of the plurality of groups to a sample storage area. After the copying step, the method samples the bits of the copied groups wherein the sampled bits form a pattern having a center bit having a binary state. Finally, after the sampling step, the method outputs a print signal representative of the binary state if the pattern does not match a predetermined pattern, or outputs a print signal different than the binary state if the pattern matches a predetermined pattern.

18 Claims, 14 Drawing Sheets

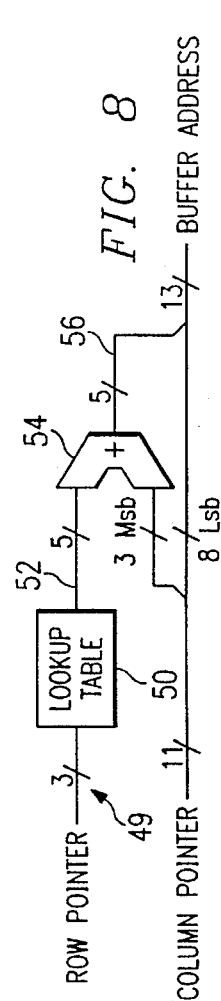

| | $P_1$ | $P_2$ | $P_3$ | $P_4$ | $P_5$ | $P_6$ | $P_7$ | $P_8$ | $P_9$ | $P_{10}$ | $P_{11}$ |
|---|---|---|---|---|---|---|---|---|---|---|---|
| 48a | RECEIVE INCOMING BYTE FROM BITMAP MEMORY 16<br><br>WA_PTR = (4,0-7)<br>BM_RPTR = 5<br>BM_CPTR = 0<br><br>WRITE BYTE TO BM(5,0) AND TO WA(4,0-7) | | | INC BM_RPTR<br>BM_RPTR = 0 | INC BM_RPTR<br>BM_RPTR = 1<br><br>DEC WA_PTR-4<br><br>WA_PTR = (0,0-7)<br><br>COPY BM(1,0) TO WA (0,0-7) | INC BM_RPTR<br>BM_RPTR = 2<br><br>DEC WA_PTR-3<br><br>WA_PTR = (1,0-7)<br><br>COPY BM(2,0) TO WA (1,0-7) | INC BM_RPTR<br>BM_RPTR = 3<br><br>DEC WA_PTR-2<br><br>WA_PTR = (2,0-7)<br><br>COPY BM(3,0) TO WA (2,0-7) | INC BM_RPTR<br>BM_RPTR = 4<br><br>DEC WA_PTR-1<br><br>WA_PTR = (3,0-7)<br><br>COPY BM(4,0) TO WA (3,0-7) | INC BM_RPTR<br>INC BM_CPTR<br><br>RECEIVE INCOMING BYTE FROM BITMAP MEMORY 16<br><br>WA_PTR = (4,0-7)<br>BM_RPTR = 5<br>BM_CPTR = 1<br><br>WRITE BYTE TO BM(5,1) AND TO WA(4,0-7) | | |
| 48b | HA(0, 0-4) TO SW(4,0-4)<br><br>WA TO HA | SW AND HA COLUMN SHIFT LEFT<br><br>HA(0, 0-4) TO SW(4,0-4) | SW AND HA COLUMN SHIFT LEFT<br><br>HA(0, 0-4) TO SW(4,0-4) | SW AND HA COLUMN SHIFT LEFT<br><br>HA(0, 0-4) TO SW(4,0-4) | SW AND HA COLUMN SHIFT LEFT<br><br>HA(0, 0-4) TO SW(4,0-4) | SW AND HA COLUMN SHIFT LEFT<br><br>HA(0, 0-4) TO SW(4,0-4) | SW AND HA COLUMN SHIFT LEFT<br><br>HA(0, 0-4) TO SW(4,0-4) | SW AND HA COLUMN SHIFT LEFT<br><br>HA(0, 0-4) TO SW(4,0-4) | HA(0, 0-4) TO SW(4,0-4)<br><br>WA TO HA | SW AND HA COLUMN SHIFT LEFT<br><br>HA(0, 0-4) TO SW(4,0-4) | SW AND HA COLUMN SHIFT LEFT<br><br>HA(0, 0-4) TO SW(4,0-4) |
| 48c | SAMPLE SUBSET AND OUTPUT CENTER PIXEL PRINT BIT | SAMPLE SUBSET AND OUTPUT CENTER PIXEL PRINT BIT | SAMPLE SUBSET AND OUTPUT CENTER PIXEL PRINT BIT | SAMPLE SUBSET AND OUTPUT CENTER PIXEL PRINT BIT | SAMPLE SUBSET AND OUTPUT CENTER PIXEL PRINT BIT | SAMPLE SUBSET AND OUTPUT CENTER PIXEL PRINT BIT | SAMPLE SUBSET AND OUTPUT CENTER PIXEL PRINT BIT | SAMPLE SUBSET AND OUTPUT CENTER PIXEL PRINT BIT | SAMPLE SUBSET AND OUTPUT CENTER PIXEL PRINT BIT | SAMPLE SUBSET AND OUTPUT CENTER PIXEL PRINT BIT | SAMPLE SUBSET AND OUTPUT CENTER PIXEL PRINT BIT |

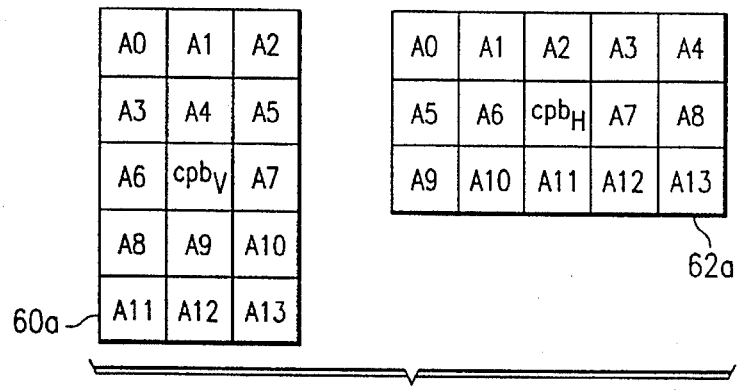
FIG. 9A
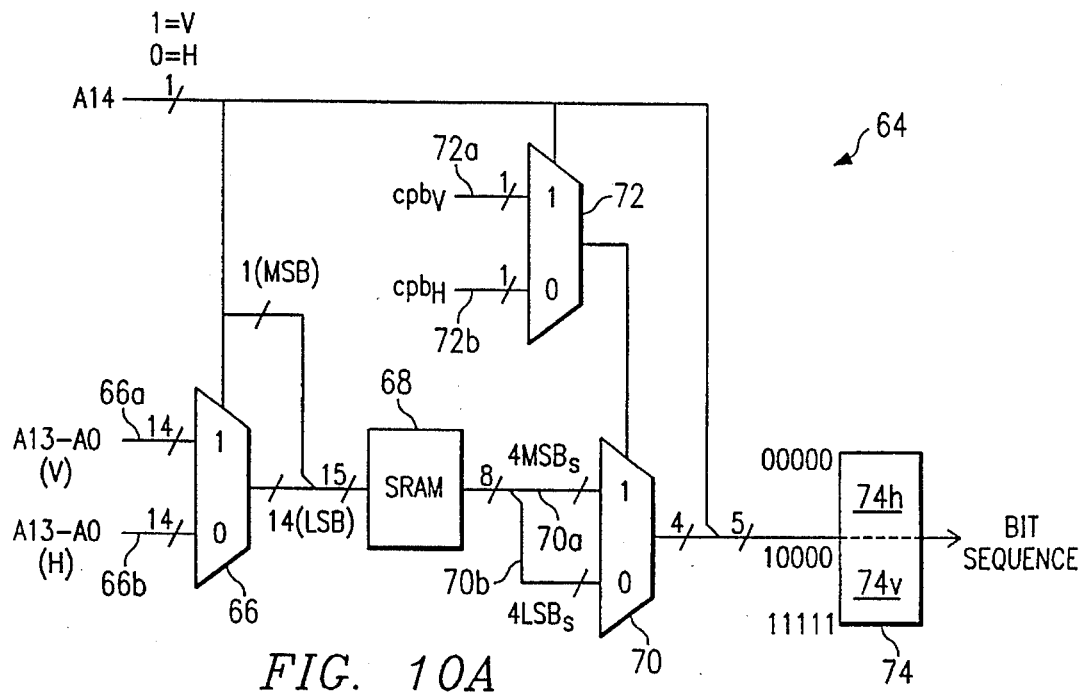
FIG. 9B
FIG. 10A

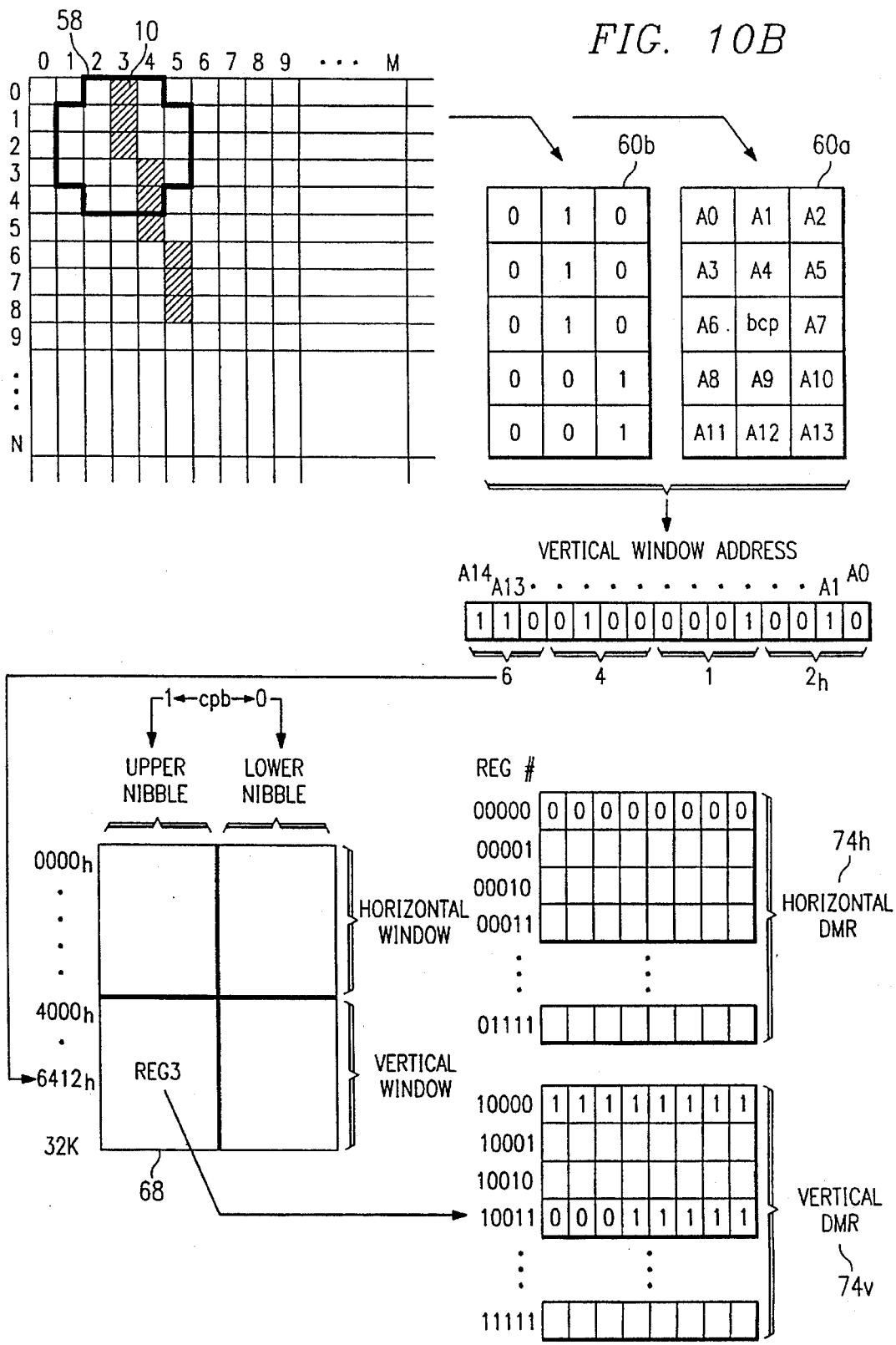

ANTI-ALIASING APPARATUS AND METHOD USING FAST SCAN-LINE MEMORY MAPPING FOR SAMPLING PIXEL PATTERNS

This invention relates to processing of digital information for printing by laser printers or the like, and is more particularly directed to an anti-aliasing apparatus and method using scan-line mapping for sampling pixel patterns.

CROSS-REFERENCES TO RELATED APPLICATIONS

This application is related to the following co-pending applications, filed contemporaneously with this application:

application Ser. No. 08/344,550, entitled "anti-aliasing apparatus and method using pixel subset analysis and center pixel correction including specialized sample window", by inventors Thomas M. Ogletree, Ralph Williamson, and Rodney Pesavento; and application Ser. No. 08/344,065, entitled "toner saver using anti-aliasing apparatus and methodology", by inventors Thomas M. Ogletree, Michael J. Dougherty, and Stephen Zaudtke.

BACKGROUND OF THE INVENTION

The present invention relates to processing of digital information for printing by laser printers or the like and, more particularly, to anti-aliasing the digital information. As known in the art, laser printers include a print engine having a laser beam which is selectively turned on and off to subsequently create printed dots on a sheet of paper. Typically, the laser scans the paper in a row-by-row fashion in a manner similar to the video rasterization for cathode ray tubes. As detailed below, the laser scans across a given row, and a darkened spot appears along the row where the laser is turned on, while a white spot appears along the row where the laser is turned off. FIGS. 1A and 1B illustrate the concept of anti-aliasing in connection with a printer system, such as laser printers, ink-jet printers, or other such binary systems. In general, anti-aliasing is a method by which jagged edges are smoothed to create a more accurate, or more appealing, appearance in printed matter. FIG. 1A illustrates a pattern before anti-aliasing, while FIG. 1B illustrates the same pattern after anti-aliasing is applied to a portion of the pattern. These Figures, as well as anti-aliasing in general, are discussed immediately below.

FIG. 1A illustrates the top left corner of a precorrected image 10 to be printed on a page designated generally at 12. For purposes of explanation, page 12 is subdivided as a matrix including a series of rows (1 through N) and columns (1 through M). Locations, or pixels, within this matrix are referred to in this document according to matrix designation, that is, as "(row, column)." For example, the uppermost darkened pixel in image 10 is at location (0,3), while the lowermost darkened pixel in image 10 is at location (8,5). For purposes of this document, note that a pixel with a darkened state is referred to a "black pixel" while a pixel with a non-darkened state is referred to as a "white pixel." Under current technology, pixels on the order of 600 by 600 dots per inch ("dpi") are printed in this manner. Thus, the few pixels of FIGS. 1A and 1B are vastly magnified to illustrate various concepts.

The pixels of image 10 are commonly stored as bits in a bitmap memory, and the memory locations are organized in a fast scan-line manner to map the desired image onto paper 12. Note that the term "fast scan-line manner" used within this document is based on the term fast scan direction known in the art. Particularly, the fast scan direction is the direction in which the printed image is formed on a page, that is, the direction in which the print mechanism (e.g., laser) scans with respect to paper 12. The fast scan direction is always perpendicular to the direction a piece of paper moves through the printer, regardless of the orientation of the page (i.e., portrait or landscape). Note also that the direction the paper moves through the printer is called either the "slow scan direction" or the "process" direction. Given this terminology, note therefore that the statement that the pixels are organized in the fast scan-line manner indicates that the memory orientation of pixel rows is the same as the lines as they will eventually be printed (i.e., scanned) across paper 12. Thus, by stating that the memory locations are organized in a fast scan-line manner, it is meant that the bits in the memory are addressable such that a first byte corresponds to the first eight bits of image 10 to be scanned (by the printing apparatus) across the top of page 12 (i.e., in the fast scan direction), a second byte corresponds to the second eight bits of image 10 to be scanned, and so forth. For a letter or other typical portrait document, the scan creates a horizontal image and, thus, the memory storage may be thought of as horizontally oriented (i.e., from the left of the page image to the right of the page image). Of course, for a landscape printing, the fast scan direction is still across the width of the page, but the actual printed image appears vertically oriented and, thus, the memory storage may be thought of as vertically oriented (i.e., from the bottom of the page image to the top of the page image). In either instance, however, the memory storage is oriented in the same manner as the fast scan-line direction as that term is defined above.

For printing the memory-stored bits, in each instance, one byte of memory corresponds to eight bits to be printed in a fast scan-line direction along a piece of paper. In this regard, one of many available types of serial interface circuits reads bytes from the bitmap memory in a byte-by-byte fashion along the scan-line rows of the memory, and for each byte, outputs a serialized data stream to the printer laser beam. Typically, the serial interface circuit outputs a laser on signal when a black pixel is encountered in memory, and a laser off signal when a white pixel is encountered in memory. In some instances, however, systems operate in a negative mode, where a laser off signal eventually results in a black pixel (rather than white). In addition, if the video is digitally inverted somewhere between the memory system and a positive developing system, then a zero in memory results in black. In any event, regardless of the conversion from binary storage state to print state, without implementing anti-aliasing technology, therefore, one skilled in the art will readily appreciate that as the laser is controlled in any of these types of fashions this fashion, image 10 from the bitmap memory is recreated onto page 12. Given the varying type of systems, for purposes of this document, and for simplicity, it is assumed that a binary 1 stored in memory corresponds to a black pixel and a laser on signal, and a binary 0 stored in memory corresponds to a white pixel and a laser off signal. One skilled in the art, however, may easily apply the teachings of the present invention to other systems such as those set forth above (e.g., negative mode, etc.).

The serial print information must account for timing mechanisms included with typical laser print engines. For example, the print engine has an associated clock (usually provided by the printer) which provides a synchronization signal indicating when the laser is to be on or off. To draw a darkened area, an on signal is coupled to the laser synchronous to the clock and for a predetermined duration. For purposes of this document, this predetermined duration is referred to as a "pixel time," meaning the amount of time the laser is on to fully complete a pixel on the printed page. Thus, when the laser is on for an entire pixel time, the laser sweeps from the left vertical border of a matrix location to the right vertical border of a matrix location, thereby creating a complete pixel. As known in the laser printer art, in actuality, the laser reacts with a photosensitive material on a drum, and the printer toner subsequently adheres to the location of the reaction, thereby creating the printed pixel.

As mentioned above, anti-aliasing technology smoothes the otherwise jagged edges of matter to be printed. For example, in FIG. 1A, one can readily recognize a jagged edge created between the pixel at (2,3) and the pixel at (3,4). However, FIG. 1B illustrates image 10 after correction; that is, after anti-aliasing, a smoother diagonal line can be created at these locations by drawing only partial pixels, that is, by only partially filling a location within the matrix to create the appearance of a shifted pixel. Particularly, systems have been recently developed which turn the laser on only during a portion of the pixel time; consequently, only a portion of the area is darkened between the left and right vertical borders of a matrix location. Further, a partial pixel may be left justified within the vertical borders by turning the laser on synchronous with the clock (i.e., at the start of the pixel time), but turning it off before the end of the pixel time. Similarly, a partial pixel may be right justified within the vertical borders by turning the laser on after some delay from the start of the pixel time, and turning it off and the end of the pixel time. Thus, in FIG. 1B, a partial pixel is right justified at location (2,3), and combines with a left justified partial pixel at location (2,4) to create the appearance of a single pixel shifted slightly to the right when compared with the original pixel at location (2,3) in FIG. 1A. Similarly in FIG. 1B, a partial pixel is right justified at location (3,3) and combines with a left justified at location (3,4) to create the appearance of a single pixel shifted slightly to the left when compared with the original pixel at location (3,4) in FIG. 1A. While not shown in FIG. 1B, one skilled in the art will also recognize that the same anti-aliasing technique could be applied to the jagged edge formed between locations (5,4) and (6,5) of FIG. 1A as well.

Having explained some basic principles regarding anti-aliasing, FIG. 2 illustrates a prior art anti-aliasing architecture designated generally at 14. Anti-aliasing architecture 14 includes a bitmap memory 16, a serial interface circuit 18, an anti-aliasing circuit 20, a buffer memory 22, and a print engine 24. Bitmap memory 16 stores bit-mapped data in the fashion described above. For example, bitmap memory 16 may store enough image data corresponding to a single page (e.g., 8.5 by 11.0 inches) of print.

Bitmap memory 16 is coupled to serial interface circuit 18. Serial interface circuit 18 reads one fast scan-line byte at a time from bitmap memory 16, and then serializes each bit of the byte by outputting one bit per pixel time. Thus, the serialized data represents the on/off signals to control the laser beam of print engine 24. Moreover, because of the fast scan-line orientation of the bitmap memory, when a byte is read from the bitmap memory and serialized, it is duplicated in the fast scan-line direction across the page by the on/of operation of the laser (and subsequent laser printer techniques known in the art).

In the prior art, however, anti-aliasing circuit 20 is interposed between serial interface circuit 18 and print engine 24. Typically, anti-aliasing circuit 20 is a chip which may be connected in such an intermediary fashion to add anti-aliasing functionality to a system which otherwise would not include such a feature. Anti-aliasing circuit 20 is also coupled to a buffer memory 22 which is commonly an external SRAM. In general, anti-aliasing circuit 20 intercepts the serialized data from serial interface circuit 18 and stores it in buffer memory 22. Further, anti-aliasing circuit 20 performs the smoothing function described above by modifying the intercepted data as explained below in connection with FIGS. 3A–3E. Anti-aliasing circuit 20 then outputs its own serialized data to print engine 24, with modifications made in accordance with the particular anti-aliasing technique employed by circuit 20. Print engine 24 includes the mechanical components of a printer, such as a laser beam, which are then controlled by the serialized data to form pixels on a page of paper.

Note that configuration 14 of FIG. 2 suffers drawbacks because data is intercepted by anti-aliasing circuit 20 after it is serialized. Particularly, precise sampling of the serial data is required to ensure pixels do not change from black to white or white to black due to sampling near the edge of a pixel rather than at the center of a pixel. Moreover, because image data is intercepted, sampled, buffered, processed, and retransmitted serially, there is an added delay. This delay causes a downward image shift on the paper because the first several rows of data, transmitted by serial interface circuit 18 and intended for the top of the paper, are intercepted and processed before being received and printed by print engine 24. During these intermediate steps, print engine 24 scans white lines across the page (because it normally would be receiving data during this intermediate period) and, only thereafter does the actual image commence printing. Thus, the addition of these white lines across the top of the page effectively shifts the printed image downward. As evident from the discussion below, there is also a shift to the right because several columns of data are similarly required.

FIGS. 3A–3E illustrate a prior art technique for performing the functions of anti-aliasing, namely, identifying a pattern to be corrected, and making a correction to the center pixel of that pattern. Particularly, FIG. 3A illustrates image 10 and page 12 of FIG. 1A, but further includes a sample window 26 (shown by darkened lines). In the example of FIGS. 3A–3E, sample window 26 is a twenty-five (i.e., five by five) pixel window.

As detailed below, sample window 26 sweeps across, and down, the intended pixel representation stored in memory in a raster-like fashion, and determines for each subset of twenty-five pixels whether an adjustment should be made to the center pixel of the patterns represented by the subset. As each determination is made, if no adjustment is to be made, then anti-aliasing circuit 20 outputs the same pixel information as was stored for the given center pixel. Thus, if the center pixel was originally black (i.e., laser on), then anti-aliasing circuit 20 outputs a laser-on signal to print engine 24. Similarly, if the center pixel was originally white (i.e., laser off), then anti-aliasing circuit 20 outputs a laser-off signal to print engine 24. To the contrary, if an adjustment is to be made to the center pixel (i.e., to cause smoothing), then anti-aliasing circuit 20 outputs different pixel information from that received from serial interface circuit 18. For example, an originally black pixel may need to be converted to a one-half dot which is left justified within the vertical borders of the pixel. As discussed above, therefore, anti-aliasing circuit 20 outputs a laser-on signal for the first half of the pixel time, and a laser-off signal for the second half of the pixel time.

Before proceeding with the example of FIGS. 3A–3E, note that image 10 of FIG. 1A is also used in FIGS. 3A–3E.

Note further that although sample window 26 is shown overlaying page 12, it should be understood that, in operation, sample window 26 is actually considering the stored representation of the pixels located in buffer memory 22. The prior art technique for storing the pixel representation in buffer memory 22 is discussed in detail below in connection with FIGS. 4A–4D. In overall operation, the anti-aliasing function samples this memory depiction of the pixels and determines if the pixel in the center of the sample, when printed, should differ from that stored in memory. If a change in center pixel state is desirable, print engine 24 is so controlled such that the actual printed center pixel differs from the corresponding center pixel in memory; however, note that the corresponding pixel data in the memory is unchanged.

Also before proceeding, note that sample window 26 is not a physical device, but instead is a representation of the functionality of anti-aliasing circuit 20, that is, the function of reviewing a stored subset of pixels to identify whether the center pixel of the subset requires correction when printed.

Referring to FIG. 3A, sample window 26 is shown in a first demonstrative position which encompasses the upper and left twenty-five pixels to be printed on page 12. Before proceeding, note that the first demonstrative position shown of window 26 is chosen for simplifying the discussion, but is not necessarily the initial position across page 12. Particularly, in the present invention, to begin the scan, window 26 is situated so that its center location aligns with the pixel located at location (0,0); in other words, the upper two rows and left two columns of sample window 26 would, in effect, extend beyond page 12, thereby encompassing only nine pixels of page 12, with the remaining sixteen pixels extending outside of window 26. Further, when the window locations extend beyond the image as described, those locations beyond the image are assumed to be in a state (e.g., white) and the actual pixels of image 10 included at this beginning step are considered as combined with these assumed white pixels for purposes of anti-aliasing. In prior art systems, however, it is believed that sample window 26 (and its associated circuitry) is merely disabled when sample window 26 is not entirely over a portion of image 10 and, thus, anti-aliasing corrections are not permitted along the edges of image 10.

Referring now to the first demonstrative position of FIG. 3A, in this position, sample window 26 (and associated circuitry) determines whether the pattern of pixels having a center pixel at location (2,2) requires correction to that center pixel. Referring now to the pre-correction image 10 of FIG. 1A and the post-correction image 10 of FIG. 1B, note that no change is made to the center pixel (i.e., at location (2,2)) of FIG. 3A and, thus, no anti-aliasing correction is required in this instance. Thus, because the memory stored center pixel is white, then anti-aliasing circuit 20 outputs a laser-off signal to print engine 24 to print an unchanged (i.e., white) pixel. Thereafter, sample window 26 shifts one pixel column to the right as further discussed immediately below in connection with FIG. 3B.

In FIG. 3B, the center pixel of sample window 26 is at location (2,3). In this position, and as indicated in FIG. 1B, a correction is required. Thus, the pixel subset encompassed by sample window 26 is recognized as a pattern requiring correction at its center location. To accomplish the correction, anti-aliasing circuit 20 consults an internal table of registers known as dot modulation registers ("DMRs"). Each DMR is programmed with a sequence of bits which are output during a single pixel time and, thus, modulate the laser beam according to the values of the bits. For example, a DMR value of 00001111 turns off the laser beam for the first half of the pixel time (in response to the four binary zeroes) and turns on the laser beam for the second half of the pixel time (in response to the four binary ones). Thus, if eight bits are used, each bit is transmitted to the laser during a ⅛th pixel time, thereby approximating control of the laser in ⅛th increments between the left and right vertical borders of the pixel.

In the example of FIG. 3B, the corrected pixel to be located at the center location of (2,3) is a ⅝ right justified dot (as confirmed by viewing FIG. 1B). Thus, in response to detecting the pixel subset in window 26, a DMR within anti-aliasing circuit 20 outputs a byte equal to 00011111, thereby turning the laser off for the first ⅜ of the pixel time, and on for the last ⅝ of the pixel time. Thus, one skilled in the art will appreciate that the partially darkened area in location (2,3) of FIG. 1B is printed on page 12 rather than the original fully darkened location (2,3) of FIG. 1A. Thereafter, once again sample window 26 shifts one pixel to the right, as discussed immediately below in connection with FIG. 3C.

In FIG. 3C, the center pixel of sample window 26 is at location (2,4). Once again, a center pixel correction is required. In the example of FIG. 3C, a different DMR is called to output the necessary sequence for a left-justified ⅜ darkened dot within location (2,4). Thus, the selected DMR outputs a value of 11100000, thereby causing print engine 24 to print the left-justified ⅜ darkened dot instead of the white pixel originally stored in bitmap memory 16 and serialized by interface circuit 18.

The process described above in connection with FIGS. 3A–3C continues across the entire top five rows of the matrix, with window 26 advancing one column at a time and evaluating its center pixel in each instance. Thus, the entirety of row 2 of pixels are individually considered for anti-aliasing as the center location of window 26 scans across such pixels. For purposes of simplification, however, each such action is not shown in the FIGS.

Once sample window 26 fully scans the top five rows as discussed above, it moves vertically down one row, thereby aligning its center pixel with row 3 of the pixels. For a brief demonstration, FIG. 3D illustrates sample window 26 in its initial position after descending one row in this fashion. Now, therefore, location (3,2) is the center location of sample window 26 and, given the pixel subset encompassed by sample window 26 in this position, once again a determination is made as to whether a change is necessary to smooth in the manner described above. For the example shown (as indicated in FIG. 1B), no change is necessary and, thus, anti-aliasing circuit 20 outputs the same binary state as is stored for the center pixel, namely, a white pixel.

Lastly, FIG. 3E illustrates the location of sample window 26 after FIG. 3D, and further demonstrates that sample window 26 continues in its raster-like fashion across rows 1–5, with row 3 aligned with its center pixel. Thus, in FIG. 3E, the pixel subset encompassed by sample window 26 is detected as having a center location (i.e., (3,3)) which requires modification and, thus, circuit 20 acts in accordance with the principles set forth above. One skilled in the art will readily appreciate that sample window 26 continues in this fashion, that is, scanning a row, descending a row and scanning the successive row, and so forth. Thus, an entire page of rows is scanned and smoothed, when necessary, with the exception of the last two rows which cannot align with the center pixel of sample window 26.

As mentioned above, the prior art anti-aliasing circuit 20 intercepts the serialized data from serial interface circuit 18 and stores the intercepted information into buffer memory 22. The following discussion of FIGS. 4A–4D details the methodology of such storage and, thereby, introduces certain aspects of the prior art which are overcome by embodiments of the present invention. FIG. 4A illustrates a detailed example of buffer memory 22 which consists of M bytes of memory storage. For purposes of illustration, these bytes are labeled 1 through M, and are addressed according to such designation. As detailed above, buffer memory 22 stores the information in a format that may be scanned by sample window 26. FIGS. 4B–4D demonstrate the prior art storage methodology.

Recall that anti-aliasing circuit 20, and therefore buffer memory 22, receive serialized information from bitmap memory 16. This information is coded as a binary 1 to indicate a black pixel, and a binary 0 to indicate a white pixel. Thus, without an anti-aliasing feature, the bits from bitmap memory 16 would be printed by print engine 24 directly onto page 12, thereby creating an image on paper 12 exactly as stored in bitmap memory 16. However, buffer memory 22 is M bytes wide and stores each incoming bit in the successively addressed locations as described with respect to FIGS. 4B–4D, below.

With reference to FIG. 4B, buffer memory 22 is shown containing the first 1 through M serialized bits from bitmap memory 16 (via serial interface circuit 18). Note that each incoming bit is stored in a different memory byte, and at the least significant bit location of such corresponding byte. For purposes of convention, the bits are shown as "B", and a subscript is added wherein the first character represents the row to be printed while the second character represents the column to be printed. For example, bit $B_{0,0}$ is to be printed at location (0,0), bit $B_{0,1}$ at location (0,1), and so forth. Thus, the first row of bits, namely $B_{0,1}$ through $B_{I,M}$, are initially stored along one row of the memory locations, but in separate memory byte locations as shown.

Recall that buffer memory 22 is used to provide a temporary buffer for storing at least a portion of the image so that the portion may be scanned by a sample window. Thus, as the second row of serialized bits arrive, they must be located "under" the first row of bits in order to re-create the bitmapped image for scanning. Toward that end, the prior art shifts the first row of bits upward by one row, and then inserts the second row of bits along the least-significant bit row as shown in FIG. 4C. To accomplish the shifting result in a memory, the prior art performs a read-modify-write operation as each bit in the second row arrives. For example, as bit $B_{1,0}$ arrives, memory byte 0 is read, the read data is modified to include the combination of $B_{0,0}$ and $B_{0,1}$, and the result is written back to byte 0. Thus, if $B_{0,0}=1$, and $B_{1,0}=0$, then a binary 00000001 (i.e., $B_{0,0}$) is read from byte 0, and is combined as the second significant bit to the incoming 0 (i.e., $B_{1,0}$), and the combined 00000010 is written back to byte address 0. This operation continues so that M read-modify-write operations are necessary to store the second row of bits into buffer memory 22, with the result shown in FIG. 4C.

As is known in the art, the read-modify-write operation is a time costly event because two memory accesses are required (i.e., one to read, one to write), and because data buses must be reversed in direction to perform the separate read and write operations. Indeed, in one aspect of the present invention, it is recognized that technological advancements are requiring a faster clock rate for providing data to print engine 24. At faster clock rates, it may be impossible, or at least economically undesirable, to perform a sufficient number of read-modify-write operations and still timely supply data out of anti-aliasing circuit 20 to print engine 24. As detailed below, the present invention eliminates the necessity of the read-modify-write operations and, in doing so, vastly enhances the ability to provide anti-aliased serial data at higher clock rates.

Note that the operation described in connection with FIGS. 4B and 4C continues as buffer memory 22 fills as illustrated in FIG. 4D (for simplicity of the drawing, only the first two and last two rows of bits are labeled). Thus, after eight successive rows are filled, the first line of bits from FIG. 4A are moved from the bottom to the top of buffer memory 22. Note, therefore, that a filled buffer memory 22 provides a region for sampling by sample window 26 as shown in FIGS. 3A–3E. Indeed, if the sample window is a five by five bit window as shown in FIGS. 3A–3E, sampling in the prior art manner described (i.e., disabling sampling until the sample window fully encompasses an image) may commence only after five rows of bits are stored in buffer memory 22 because, at such a point, sufficient data is collected to begin determining whether center pixel correction is required. However, additional rows may be used because of availability, timing considerations, larger sampling windows, as well as other bases known in the art.

Once each of the eight rows of buffer memory 22 is filled as shown in FIG. 4D, note that the next row of incoming information is again written into the least significant location of the respective bytes using respective read-modify-write operations. Consequently, the information which is eight rows earlier and stored at the top of buffer memory 22 in FIG. 4D is shifted out of the memory and, thus, for each successive line of serialized data, only it as well as the seven preceding lines of bits are retained.

Given the technique of FIGS. 4A–4D, note that a filled buffer memory 22 stores the pixel data in a non-scan-line fashion, as opposed to the fast scan-line fashion of bitmap memory 16. By stating that the buffer memory 22 locations are organized in a non-scan-line manner, it is meant that the pixels within an addressable location within buffer memory 22 correspond to a perpendicular representation of how those pixels would appear when printed in the fast scan-line direction by print engine 24 (i.e., the pixels are stored in buffer memory 22 in the slow scan direction).

Due to the non-scan-line disposition of buffer memory 22, note the effect on the operation of sample window 26 as shown in FIGS. 3A–3E. In order to evaluate five columns of pixels (e.g., for a five by five pixel window), five bytes of buffer 30 memory must be read. Note that the least significant bits of each of the five bytes constitute a fast scan-line row of pixels. Similarly, the most significant bits of each of the five bytes constitute a fast scan-line row of pixels and, indeed, each of the other respective significant bits of each of the five bytes constitute a fast scan-line row of pixels. Thus, by reading the five addressable locations, a window of bits is created having five columns and which is eight rows high (because each addressable location has eight bits).

The non-scan-line orientation of buffer memory 22 in the above fashion is inefficient for numerous reasons. First, as described above, the implementation requires numerous read-modify-write operations. Second, because each addressable location only stores one fast scan-line pixel, the number of memory locations must equal (or be greater than) the number of pixels which will be printed along a given line of paper. Thus, for an eleven inch wide piece of paper using 800 dots per inch, 8800 pixels may be printed and, hence, the memory must have 8800 byte locations. Third, the above example illustrates a potential waste of memory space.

Particularly, commercially available memories are commonly eight bits wide (i.e., eight bits per byte). However, when using a five by five sample window, only five bits per byte are necessary. Thus, the three extra bits per byte are unnecessary and are wasting 37.5% of each byte.

In view of the above, there are numerous drawbacks and disadvantages of the prior art apparatus and methodology involved in anti-aliasing for binary printers. It is therefore an object of the present invention to provide an improved apparatus and methodology for anti-aliasing in binary printers.

It is a further object of the present invention to provide such an apparatus and methodology for processing image data before serialization.

It is a further object of the present invention to provide such an apparatus and methodology for reducing the time, hardware, and cost required for processing bitmap data to perform anti-aliasing.

It is a further object of the present invention to provide such an apparatus and methodology for simplifying the timing and control logic between data stored in a bitmap memory and a print engine while performing anti-aliasing.

It is a further object of the present invention to provide such an apparatus and methodology for permitting flexibility, efficiency, and programmability when detecting patterns represented by subsets of pixels.

It is a further object of the present invention to provide such an apparatus and methodology for reducing the amount of printer resource, such as printer toner, when printing hollowed features using anti-aliasing functionality.

Still other objects and advantages of the present invention will become apparent to those of ordinary skill in the art having references to the following specification together with its drawings.

SUMMARY OF THE INVENTION

In the preferred embodiment, the present invention includes a method and apparatus for anti-aliasing using fast scan-line mapping for sampling pixel patterns. The method processes a plurality of bits stored in a first memory and representing an image to be printed by reproducing the bits in a scan direction. The method includes the step of reading a plurality of groups from the first memory into a second memory, wherein each of the groups comprises a number of bits greater than one bit and is stored in the second memory in the scan direction, and wherein each group is read one group at a time. Further, the method includes copying a predetermined number of bits from each of the plurality of groups to a sample storage area. After the copying step, the method samples the bits of the copied groups wherein the sampled bits form a pattern having a center bit having a binary state. Finally, after the sampling step, the method outputs a print signal representative of the binary state if the pattern does not match a predetermined pattern, or outputs a print signal different than the binary state if the pattern matches a predetermined pattern. Apparatus related to the method are also disclosed.

BRIEF DESCRIPTION OF THE DRAWINGS

For a more complete understanding of the present invention, and the advantages thereof, reference is now made to the following descriptions taken in conjunction with the accompanying drawings, in which:

Figures 4B, 4C:
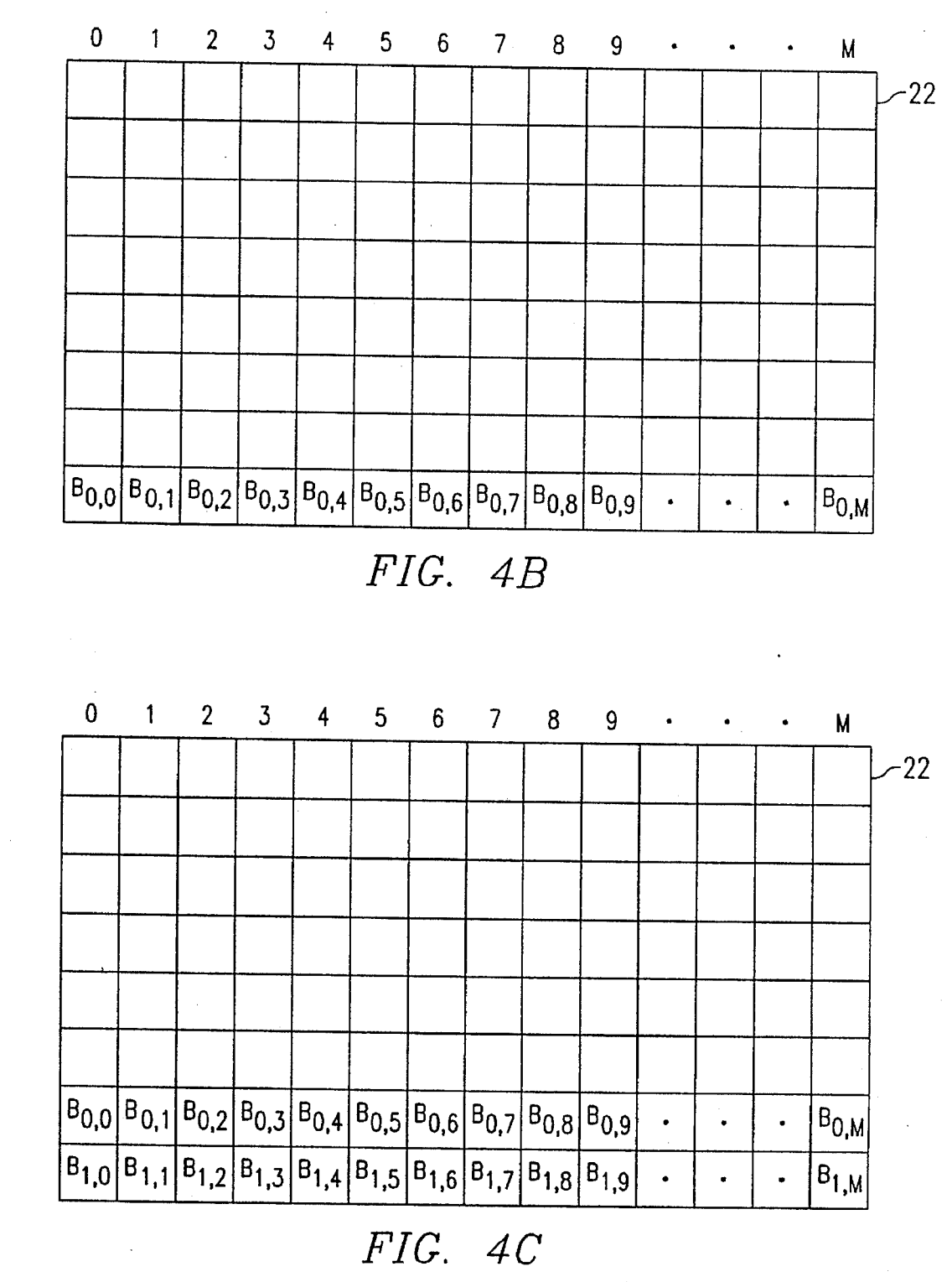

FIG. 4B illustrates the prior art buffer memory of FIG. 4A and containing the first 1 through M serialized bits from a bitmap memory;

FIG. 4C illustrates the prior art buffer memory of FIG. 4B after shifting the first row of bits upward by one row, and then inserting the second row of bits along the least-significant bit row;

FIG. 7 illustrates concurrent data transfer between buffer memory 32, working area 44, holding area 46, and sample window 38 of FIGS. 5 and 6;

FIG. 8 illustrates a simplified apparatus for addressing the buffer memory given the initial need for a thirteen bit addend and a thirteen bit multiplier;

FIG. 9A illustrates a diagrammatic view of the creation of a sample window 58 in accordance with the present invention;

FIG. 9B illustrates address windows 60a and 62a corresponding to windows 60 and 62 of FIG. 9A;

FIG. 10A illustrates a diagram of the preferred circuit for receiving an address from sample window 58 of FIG. 9A and translating that address to a center pixel output;

FIG. 10B illustrates an example of the operation of FIG. 10A to decode a pattern of bits encompassed by sample window 58 and to modulate a new center pixel for that pattern;

DETAILED DESCRIPTION OF THE PREFERRED EMBODIMENTS

The preferred embodiment of the present invention and its advantages are best understood by referring to FIGS. 5–13G of the drawings, like numerals being used for like and corresponding parts of the various drawings.

The detailed description of an exemplary embodiment of the anti-aliasing apparatus and methodology of the present invention is organized as follows:

1. Overall Anti-Aliasing Architecture
2. Fast Scan-line Mapping For Sampling Pixel Patterns
3. Buffer Memory Addressing Apparatus
4. Pixel Subset Analysis and Center Pixel Correction Including Specialized Sample Window
5. Toner Saver Apparatus and Methodology
6. Conclusion This organizational table, and the corresponding headings used in this detailed description, are provided for the convenience of reference only.

1. Overall Anti-Aliasing Architecture

Figure 2:
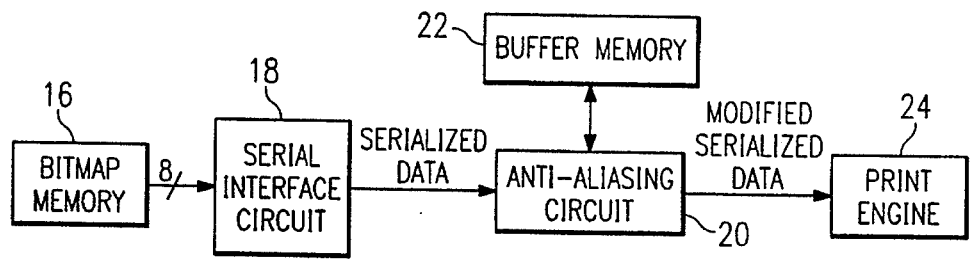
FIG. 2 illustrates a prior art anti-aliasing 1B architecture.
Figure 3A:
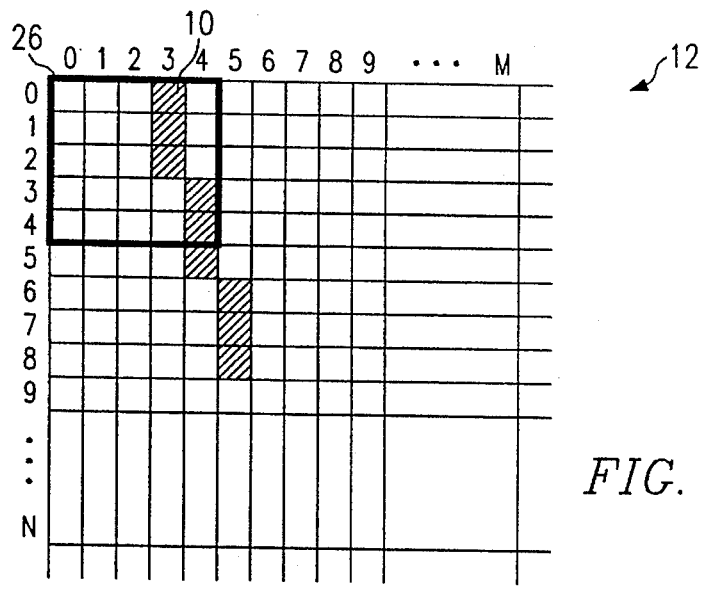
FIG. 3A illustrates a page having the pixel pattern of FIG. 1A, but further including an anti-aliasing sample window.
Figure 3B:
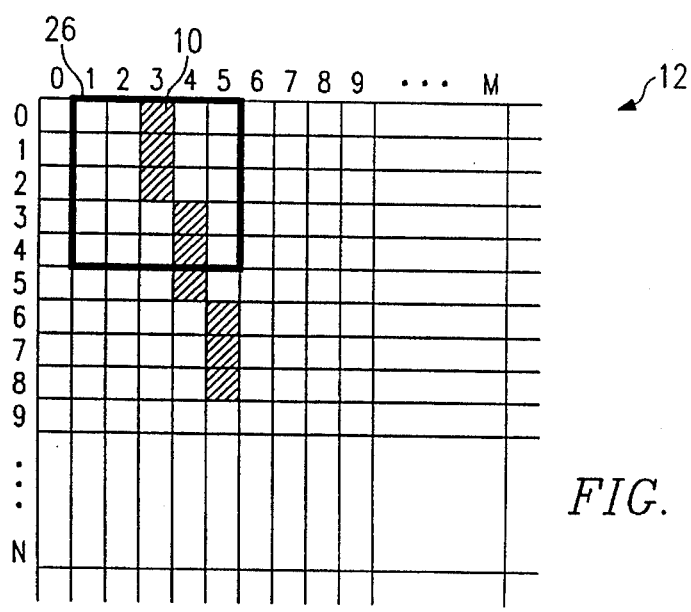
FIG. 3B illustrates the shifting of the sample window by illustrating the page of FIG. 3A, wherein the sample window is shifted one column to the right in comparison to FIG. 3A.
Figure 3C:
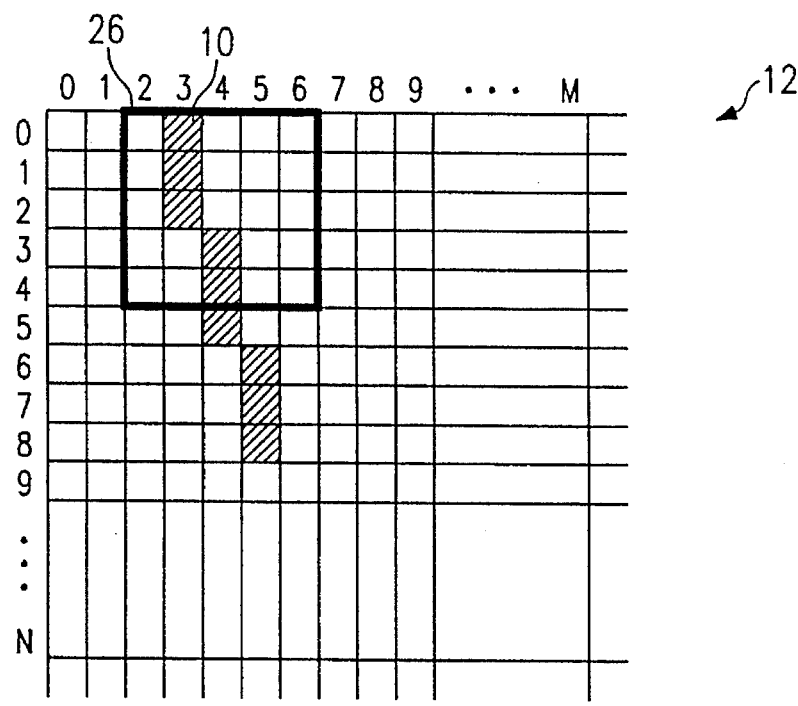
FIG. 3C illustrates the shifting of the sample window by illustrating the page of FIG. 3B, wherein the sample window is shifted one column to the right in comparison to FIG. 3B.
Figure 3D:
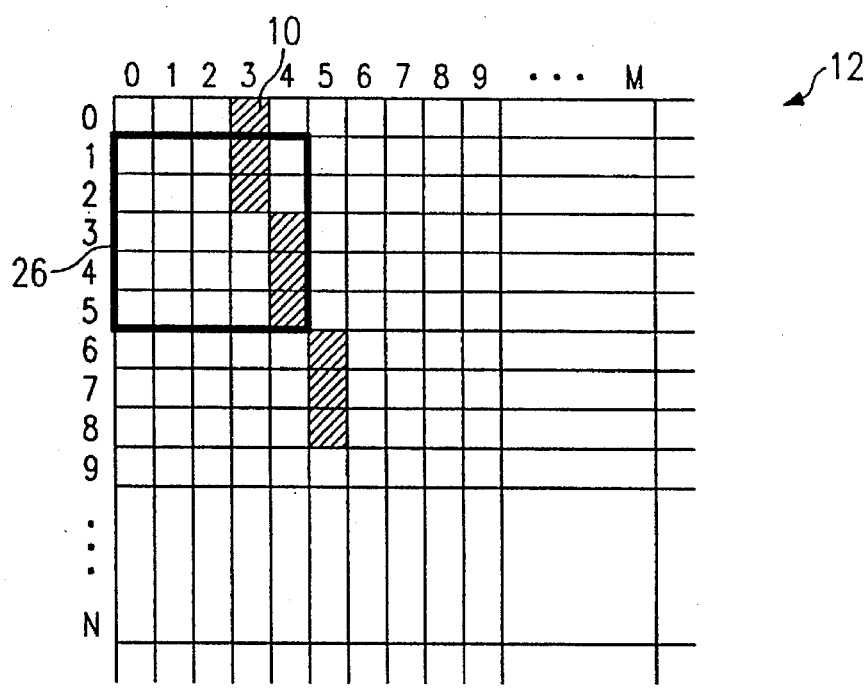
FIG. 3D illustrates the shifting of the sample window by illustrating the page of FIG. 3A, wherein the sample window is shifted one row down in comparison to FIG. 3A.
Figure 3E:
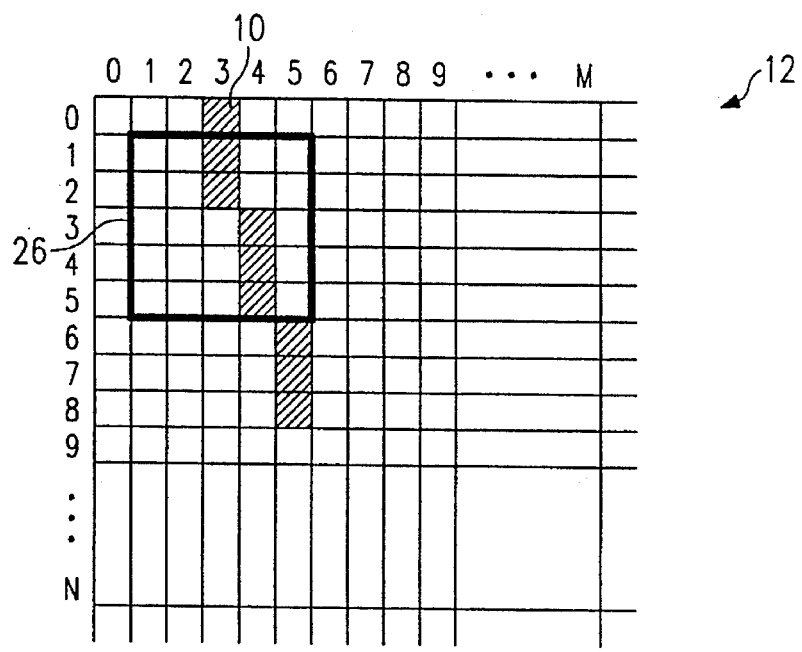
FIG. 3E illustrates the shifting of the sample window by illustrating the page of FIG. 3D, wherein the sample window is shifted one column to the right in comparison to FIG. 3D.
Figure 4A:
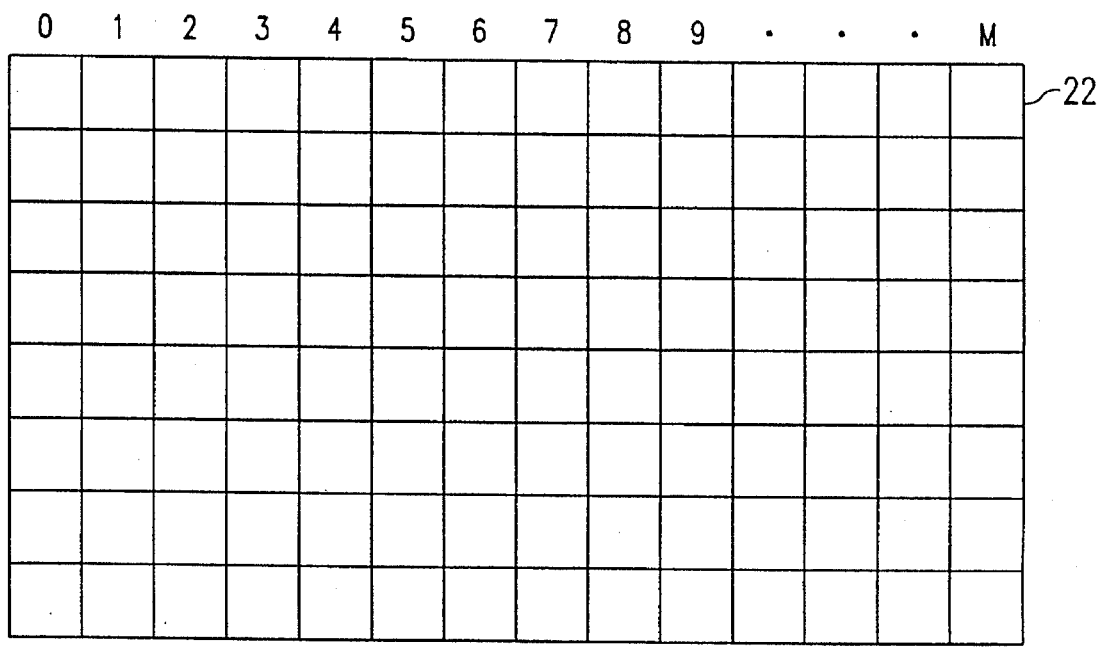
FIG. 4A illustrates a prior art buffer memory consisting of M bytes of memory storage and for storing pixel information in respective bits of the buffer memory.
Figures 4D, 5:
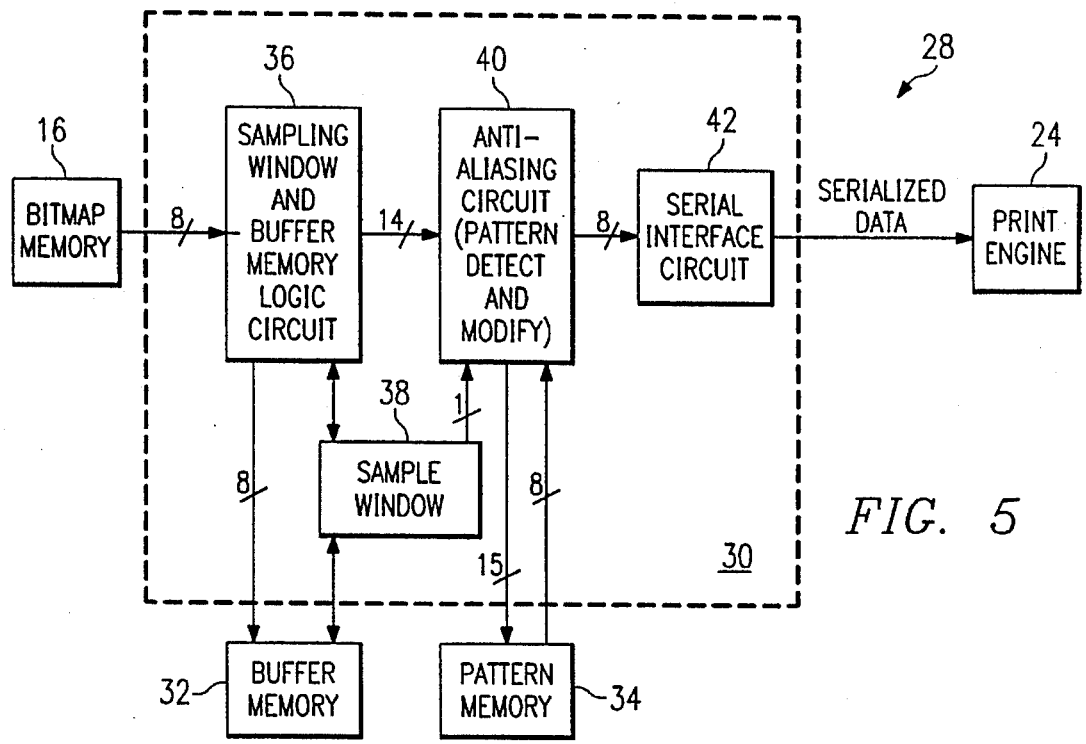
FIG. 4D illustrates the prior art buffer memory of FIG. 4C after completely filling each byte.
FIG. 5 illustrates a block diagram of the anti-aliasing architecture of the present invention.

FIG. 5 illustrates a block diagram of the anti-aliasing architecture of the present invention designated generally at 28. Anti-aliasing architecture 28 is preferably implemented with the prior art bitmap memory 16 and prior art print engine shown also in FIG. 2. However, in contrast, FIG. 5 alternatively illustrates an anti-aliasing chip 30. Anti-aliasing chip 30 communicates with an external buffer memory 32 and an external pattern memory 34. Buffer memory 32 is preferably an 8 kilobyte SRAM memory and pattern memory 34 is preferably a 32 kilobyte memory. While memories 32 and 34 are shown as external devices, one skilled in the art may readily incorporate these storage elements within chip 30 without departing from the scope of the intended invention. For commercial purposes, however, off the shelf memories are readily available at the preferred sizes and speeds, and to perform the functions described herein.

Anti-aliasing chip 30 internally includes a sampling window and buffer memory logic circuit 36 (hereinafter "logic circuit 36"), a sample window 38, an anti-aliasing circuit 40, and a serial interface circuit 42. Note that each of the blocks of FIG. 5 is drawn for purposes of ease of explanation, with it understood that a person skilled in the art could re-draw the blocks or the like without departing from the functionality set forth herein. Thus, the block definitions set forth herein are merely exemplary, and also may be changed by a person skilled in the art without departing from the scope of the intended invention.

Before proceeding with the detailed implementation, a brief overview of FIG. 5 is instructive. Both bitmap memory 16 and print engine 24 operate as described in connection with FIG. 2. Thus, bitmap memory 16 stores bit-mapped data oriented in the fast scan-line direction as described above. Further, print engine 24 includes the mechanical components of a printer, such as a laser beam, which are controlled by the serialized data to create pixels on a page of paper. Chip 30 evaluates the information in bitmap memory and, after anti-aliasing, outputs serialized data to print engine 24. As detailed below, however, timing is greatly enhanced over the constraints imposed by the prior art because, in FIG. 5, the anti-aliasing functionality is preferably interposed before the data is serialized, that is, by placing chip 30 immediately after the bitmap memory and before the serialization of print data.

In general, logic circuit 36 reads (or receives from a controller or the like) pixels from bitmap memory 16 one byte at a time. As detailed below, logic circuit 36 then writes each byte to buffer memory 32, and then further manipulates the data through intermediary storage devices for sampling. Next, under control of logic circuit 36, a subset of data pixels in buffer memory 32 is sampled by sample window 38 to detect whether, given the pattern of pixels of the subset, the center pixel of the pattern should be modified to perform smoothing. To perform this step, the pattern within the window is converted into a fifteen bit address which, for reasons detailed below, is broken into a separate fourteen bit and one bit component. The combined fifteen bits address a location within pattern memory 34 which is programmed to output an eight bit output corresponding to the sampled pattern.

The eight bit output from pattern memory 34 effectively addresses one of several dot modulation registers ("DMRs"). As in the prior art and as discussed in the Background, each DMR stores a different group of bits to selectively turn the laser on and off to draw within the left and right vertical borders of a pixel. Thus, based on the pattern detected by sample window 38 (as determined by buffer memory 32), pattern memory 34 selects a corresponding DMR, and a modification, if necessary, is made when printing the pixel corresponding to the center pixel in sample window 38. Toward that end, the group of bits from the selected DMR is serialized by serial interface circuit 42 and coupled to print engine 24.

2. Fast Scan-line Mapping For Sampling Pixel Patterns

Figure 6:
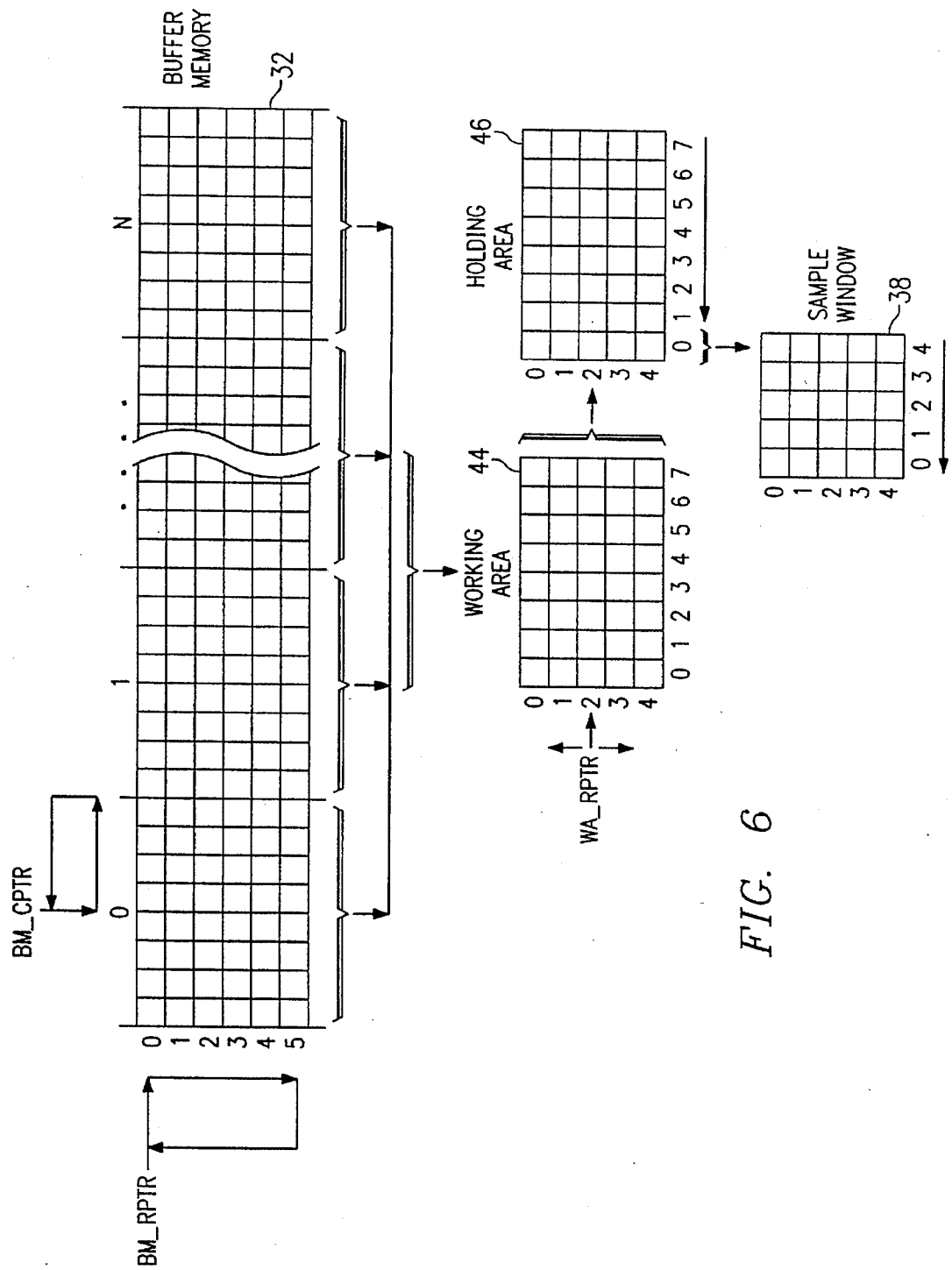
FIG. 6 illustrates a diagrammatic view of the various storage devices involved in the transfer of pixel data from a bitmap memory to a sample window 38.

FIG. 6 illustrates a diagrammatic view of the various storage devices involved in the transfer of image from bitmap memory 16 to sample window 38. Specifically, a working area 44 and holding area 46 are configured to pass information from bitmap memory 16 to sample window 38. The components of FIG. 6 are preferably dimensioned as shown for reasons more readily apparent below. Thus, buffer memory 32 has six rows (labeled rows 0–5), with each row containing N bytes. Further, both working area 44 and holding area 46 include five rows of register bit elements (labeled rows 0–4), with each row having eight register bit elements. Sample window 38 includes five rows of register bit elements, with each row having five bit register elements.

Each of buffer memory 32, working area 44, holding area 46, and sample window 38 is described herein as an array for purposes of referencing data locations. Thus, like the Figures above, typical (row, column) reference is used to indicate a location within these storage elements. However, with reference to buffer memory 32 and working area 44, locations are identified as bytes unless stated otherwise, while locations are identified as bits within holding area 46 and sample window 38. This byte/bit convention is followed due to the size and orientation of the transfer of information between components, and is better appreciated below. Moreover, as an example, with reference to buffer memory 32, the top left byte is location (0,0), while the bottom right byte is location (5,N). As another example, with reference to holding area 46 (or sample window 38), the location (2,1) indicates the individual bit location in the third column of the second row of the area.

Before proceeding with a specific and precise discussion including timing, an overview of the operation of the FIG. 6 components is instructive. Pixel bytes are copied one at a time from bitmap memory 16 to buffer memory 32, preferably using known DMA techniques, and stored in buffer memory 32 in the scan direction. For example, the first eight bits to be printed as the first eight scanned bits are stored in byte (0,0), the second eight bits to be printed as the second eight scanned bits are stored in byte (0,1), and so forth. This succession along the scan direction is shown by the advancement of the buffer memory column pointer, denoted $BM_{13}$ CPTR on FIG. 6. Once an entire row of buffer memory 32 is filled, the addressing is incremented so that the very next byte to be printed in the scan direction is stored in location (1,0). The DMA process continues as all six consecutive scan lines of pixel data are stored within buffer memory 32. Note that this filling process creates a significant advantage over the prior art in that entire bytes of image data are read from bitmap memory 16 as opposed to serializing single bits from the bitmap memory in the prior art. For example, because entire bytes are received at a time, data throughput rates are greatly increased, thereby allowing operability for higher printing rates and/or greater data resolution. These benefits as well as others are apparent from the operational description below.

Once buffer memory 32 stores a pixel byte, pattern recognition and center pixel correction commences. In addition, however, the DMA process continues because buffer memory 32 is circular in nature. Thus, each buffer memory row is filled and, after the sixth line of pixels is read from bitmap memory 16 and is written to buffer memory row 5, the addressing of buffer memory 32 circles back to its top row. This succession in a circular fashion is further shown by the advancement of the buffer memory row pointer, denoted $BM_{13}$ RPTR on FIG. 6. Consequently, the seventh line from bitmap memory 16 is written over the oldest line of data in buffer memory 32 (i.e., row 0). Likewise, the eighth line of pixels is read from bitmap memory 16 and written to buffer memory row 1, and so forth until the entire page (or other unit) of information is read from bitmap memory 16.

With it understood that DMA continues between buffer memory 32 and bitmap memory 16, reference is now made to the further processing of pixel data with working area 44, holding area 46, and sample window 38.

Working area 44 is included to store a five byte representation of the image to be printed, with the bytes oriented in the scan direction which, therefore, is in the same orientation as in buffer memory 32. Thus, working area 44 stores what may be thought of as a window of forty bits in the exact orientation of the image to be printed. In other words, each byte of this forty bit window represents eight bits to be printed in the scan direction and, in addition, each byte in working area 44 is disposed in the same manner as it will be printed; thus, the top row (or byte) of working window 44 is intended to be printed over the bits stored in the row immediately under the top row, and so forth in a vertical direction down the five rows of working window 44.

After the forty bit image is stored in working area 44, the image is copied into holding area 46. In this manner, working area. 44 is then free to receive a new forty bit image from buffer memory 32. Moreover, with a copy of the forty bit image in holding area 46, the invention then operates to shift the bits of all columns of sample window 38 to the left one column (i.e., thereby discarding the bits of the far left column), while concurrently shifting into its right column one column of holding area 46. In this manner, one new column of bits (i.e., a vertical slice of bits) is added to sample window 38 at a time and, after receiving such a column, window 38 encompasses a five bit by five bit pattern for pattern sampling. This pattern may be analyzed as in the prior art technique of FIGS. 3A–3D, or in an alternative inventive manner detailed in Section 4, below.

Having provided an overview of the operation of the FIG. 6 components, the architecture of each component is now described in greater detail and, thereafter, a detailed explanation is provided using FIG. 7 to demonstrate the specific movement of data as generalized above.

As stated above, buffer memory 32 is an eight kilobyte SRAM memory in the preferred embodiment. The specific size of buffer memory 32 is selected in accordance with the size of the data to be stored in each of its rows. Particularly, a single line of pixel data to be printed as an image is stored as a single row of buffer memory 32 and in the same scan direction as stored in bitmap memory 16. Thus, given an image 11.0 inches wide, and given a resolution of 800 dpi, a total of 8800 (i.e., 11×800=8800) bit storage elements are needed in buffer memory 32 in the scan direction. Since each storage element is 8 bits wide (i.e., one byte), then at least 1100 bytes of storage are preferable for one row of buffer memory 32 (i.e., N in FIG. 6 equals 1100). Further, the number of rows in buffer memory 32 is selected to accommodate at least the desired number of rows of pixels which are sampled to detect a pattern and perform anti-aliasing. Thus, when implementing a sample which is five rows high, such as in the case of the sampling technique of FIGS. 3A–3E, buffer memory 32 has at least five rows, each having at least 1100 bytes of storage. In the preferred embodiment, an additional row is included such that buffer memory 32 includes six rows as shown. Consequently, buffer memory 32 preferably includes at least 6600 bytes (i.e., 1100 row bytes*6 rows). In the preferred embodiment, therefore, and as stated above, buffer memory 32 is preferably an 8 kilobyte SRAM memory which is readily available from commercial sources and includes the minimum of 6600 bytes as determined above.

Working area 44, holding area 46, and sample window 38 are preferably formed using dedicated registers, such that each register bit location is individually accessible for writing a bit to a location, or reading a bit from a location to any other location in communication with the location. Thus, unlike buffer memory 32 which, as an SRAM, requires timed addressing, each element of working area 44, holding area 46, and sample window 38 may be written/read at any time.

The operation of the elements of FIG. 6 follows, and is described in terms of function and steps. One skilled in the art will readily appreciate, however, that such function and steps are under the control of logic circuit 36 (see FIG. 5). One skilled in the art also will readily appreciate that such logic may be implemented using various different architectures so as to perform the various functionality.

As suggested above, data transfer is concurrently occurring between buffer memory 32, working area 44, holding area 46, and sample window 38. FIG. 7 illustrates these concurrent actions, and shows the timing in terms of successive pixel times, designated $p_1$, $P_2$, and so forth. For purposes of explanation, therefore, FIG. 7 illustrates three sequences, namely sequence 48a, 48b, and 48c. In general, the sequences are as follows. Sequence 48a illustrates the filling of working area 44 with the forty bits described above. Sequence 48b illustrates the transfer of the forty bits from working area 44 to holding area 46, and from holding area 46 to sample window 38. Lastly, sequence 48c illustrates that, during each pixel time, a five by five bit subset is sampled (and its center pixel is altered when printed if the pattern represented by that subset is one of several patterns requiring alteration to its center pixel).

Before turning to the specific sequences, note for simplifying the following explanation that it is assumed that all six rows (i.e., rows 0–5) of buffer memory 32 have already stored pixel bytes from bitmap memory 16 (using DMA in the preferred embodiment) a first time, and, because buffer memory 32 is circular, that rows 0–4 are written a second time, thereby overwriting the earlier stored pixel bytes in those rows. Under this assumption, and as appreciated below, data has already transferred from buffer memory 32 to working area 44 to holding area 46, and is being sampled by sample window 38.

Turning now to sequence 48a, the first step occurs over three pixel times, that is, from $p_3$ through $P_3$. During this first step, note that the buffer memory row pointer, $BM_{13}$ RPTR, equals 5 because data to row 4 was just completed under the assumption set forth above. Also because row 4 was just completed, the buffer memory column pointer, $BM_{13}$ CPTR, equals 0 as it is pointing to the first column of buffer memory 32. Still further, in order to begin filling working area 44, its row pointer, $WA_{13}$ RPTR equals 4. to point to the bottom row of working area 44.

In the first step of sequence 48a, an incoming byte from bitmap memory 16 is written to both buffer memory 32 and working area 44, in accordance with the respective pointers of both storage devices. Thus, the incoming byte is written to byte location (5,0) of buffer memory 32, and bit locations (4,0–7) of working area 44. At this point, therefore, the stored information may be thought of as being duplicated in the bottom rows of buffer memory 32 (first column) and working area 44. The goal is to complete the remaining four rows within working area 44 with rows of bits in the same orientation as the bits will be printed. The second through sixth steps demonstrate the preferred method for accomplishing this goal.

The second step of sequence 48a occurs during $P_4$. During this step, the row pointer of buffer memory 32, $BM_{13}$ RPTR, is incremented. As a result, $BM_{13}$ RPTR in this example now points to row 0 of buffer memory 32 and, thus, points five rows vertically over the byte stored in the first step discussed above. No byte is read from buffer memory 32 during this step.

The third step of sequence 48a occurs during $P_5$. During this step, the next successive byte from bitmap memory 16 (and buffer memory 32) is copied to working area 44 in the following manner. Again the row pointer of buffer memory 32 is first incremented so that $BM_{13}$ RPTR=1. Thus, note that $BM_{13}$ RPTR is now pointing to the byte four rows vertically over the byte stored in buffer memory (5,0) discussed in the first step, above. Since the current example assumes that buffer memory rows 0–5 have previously been written once, note that the byte now pointed to by $BM_{13}$ RPTR is, therefore, the image byte to be printed four scan lines above the byte stored in buffer memory (5,0). Thus, also during the third step, the working area 44 row pointer, $WA_{13}$ RPTR, is temporarily decremented by four with respect to the bottom row of working area 44. Thus, note that $WA_{13}$ RPTR is now pointing to the top row of working area 44. Next, therefore, the byte pointed to by $BM_{13}$ RPTR (in column 0 as pointed to by the buffer memory column pointer, $BM_{13}$ CPTR) is read and written to the location in working area 44 identified by its row pointer, $WA_{13}$ RPTR. Thus, at this point, note that working window 44 has the most recently received byte from bitmap memory 16 in its bottom row, and in its top row the bits to be printed four bytes above that byte.

The fourth step of sequence 48a occurs during $P_6$, and is functionally identical to the third step, with the only difference being the locations identified by the $BM_{13}$ RPTR and $WA_{13}$ RPTR pointers. Particularly, again $BM_{13}$ RPTR is incremented and, thus, points to the byte location (2,0) which is three rows vertically over the byte stored in buffer memory location (5,0) discussed in the first step, above.

In this fourth step, $WA_{13}$ RPTR is again temporarily decremented, but this time, only by three with respect to the bottom row of working area 44. Thus, $WA_{13}$ RPTR now points to working area row 1. Next, like the third step, the byte pointed to at buffer memory location (2,0) is read and written to the location in working area 44 identified by $WA_{13}$ RPTR. Thus, at this point, note that working window 44 has the most recently received byte from bitmap memory 16 in its bottom row, and in its top two rows the two bytes to be printed three and four bytes above that bottom row byte.

The fifth step of sequence 48a occurs during $P_7$ and, again, is functionally identical to the third and fourth steps with the exception of changes in $BM_{13}$ RPTR and $WA_{13}$ RPTR. Specifically, $BM_{13}$ RPTR, is incremented and $WA_{13}$ RPTR is again temporarily decremented, but this time, only by two with respect to the bottom row of working area 44. Next, as in the third and fourth steps, the byte pointed to at buffer memory location (3,0) is read and written to working area row 2 as identified by $WA_{13}$ RPTR.

The sixth step of sequence 48a occurs during $P_8$ and, again, operates like the second through fifth steps to copy a byte from buffer memory (4,0) to working area row 3 (using the pointers in the same fashion). Thus, at the conclusion of $p_8$, note that working area 44 stores five bytes which represent a copy from buffer memory 32 of five fast scan-line sets of bits (i.e., forty bits) to be printed in the fast scan-line direction. Note also that the first step of $p_1$ through $p_3$ then repeats during $P_9$ through $p_{11}$; however, the buffer memory column pointer, $BM_{13}$ CPTR is incremented so that the next five bytes copied from buffer memory 32 to holding area 44 are copied from column 1 of buffer memory 32.

Sequence 48b illustrates the transfer of the forty bits from working area 44 to holding area 46, and from holding area 46 to sample window 38. The goal is to duplicate the bits from working area 44 to holding area 46, and to have sample window 38 scan the bits in holding area 46. The steps to achieve these goals are as follows. During $p_1$ of sequence 48b, holding area column 0 is parallel loaded into sample window column 4. By parallel loading, it is meant that each bit is copied at once, and is copied to the corresponding bit location in holding area 46. As appreciated later, this action permits what was originally the eighth column of pixels in holding area 46 to be processed (the other seven columns have already been shifted out, as detailed below). At the same time of the column load between holding area 46 and sample window 38, each bit of working area 44 is parallel loaded into holding area 46. Thus, at this point, working area 44 is duplicated into holding area 46; consequently, working area 44 is free to begin accepting new data bytes from buffer memory 32 as described in connection with sequence 48a. Indeed, sequence 48a is concurrent with sequence 48b and, thus, since working area 44 is free to receive new data by the end of $p_1$, the first byte of data is so loaded by the end of $P_3$ in the first step of sequence 48a as described above.

During $P_2$ of sequence 48b, sample window 38 shifts each of its columns one position to the left. Thus, the data in sample window 38 column 4 from $p_1$ is shifted to its column 3 during $p_2$. Also during $p_2$, holding area 46 shifts each of its columns one position to the left. For example, therefore, the data in holding area 46 column 7 from $p_1$ is shifted to its column 6 during $P_2$. Lastly during $p_2$, holding area column 0 is again parallel shifted into sample window column 4.

During pixel times $P_3$ through $p_8$ of sequence 48b, the same respective steps occur as in $p_2$ of sequence 48b. Thus, one skilled in the art will appreciate that each pixel time in sequence 48b provides a new column of data from holding area 46 into sample window 38. Therefore, because of the assumption that data transfer has already commenced at an earlier time, each new column into sample window 38 combines with the pixels in sample window columns 0 through 3 and, therefore, creates a new five by five bit subset of bits for sampling. For purposes of visualization, this action may be thought of as sample window 38 scanning over the data in holding area 46, moving from left to right, and stopping each pixel time to encompass twenty-five bits (i.e., five by five bits) at a time.

In addition to the above, note from $P_2$ through $P_7$ of sequence 48b that a total of seven shifts occur from holding area 46 to sample window 38. Thus, the eighth shift occurs in $P_9$ (in the same manner as $P_1$) as discussed above where it was stated that this action permits what was originally the eighth column of pixels in holding area 46 to be processed. Further, note that $P_{10}$ and $p_{11}$ again begin the process of column shifting and moving in the same manner as $p_2$ and $P_3$, as the process continuously repeats for the next group of pixels.

Sequence 48c illustrates that, during each pixel time, a subset of bits (five by five in the current example) is sampled and the center pixel of the subset is altered when printed if the subset is one of several patterns requiring alteration to its center pixel. As an example, in the context of FIG. 5, during each pixel time, chip 30 evaluates the particular bit subset pattern encompassed by sample window 38 during that pixel time, and outputs serialized information corresponding to the center pixel of the subject pattern. The sampling and alteration is, therefore, accomplished in conjunction with the inventive use of apparatus and method as demonstrated by FIGS. 6 and 7. Note also that the sampling and alteration may be performed either according to conventional techniques, or under the inventive method described beginning in Section 4, below. In either case, the additional concepts demonstrated by FIGS. 6 and 7 vastly decrease the amount of time required to maintain a coherent sample window for purposes of anti-aliasing.

In view of the above, note that FIGS. 5–7 demonstrate that the present invention processes image data before serialization, and into buffer memory 32 eight pixels at a time. Thus, in contrast to the prior art, the time limitations imposed by sampling serialized pixels are avoided. Moreover, by handling eights pixels at a time, one byte write and four byte reads are required for each eight image pixels processed. This is five byte accesses of buffer memory 32 per 444.44 nS (assuming 55.56 nS per pixel), which averages out to one simple buffer memory 32 access every 88.88 nS. This compares with the prior art approach of FIGS. 4A–4D which requires one read-modify-write cycle per 55.56 nS. Also, the data bus to buffer memory 32 changes direction only once per 444.44 nS, rather than once ever 55.56 nS as required in the prior art. This greatly simplifies the timing and control logic which must prevent bi-directional bus contention between buffer memory 32 and related circuity, thereby creating a reduction in SRAM access time and cost. In addition to the above, since data pixels are stored in the fast scan-line direction in buffer memory 32, the buffer dimensions are extremely flexible.

3. Buffer Memory Addressing Apparatus

As stated above, buffer memory 32 is addressed in a circular fashion, thereby overwriting data such that only the five most recent scan lines of pixel data are stored therein. FIG. 8, along with Table 1, below, illustrate the concepts surrounding this addressing concept.

Table 1, below, illustrates the preferred hexadecimal addresses of the six rows of buffer memory 32.

TABLE 1

| Row 0 | 0x0000 ... 0x04ff | 1280 bytes |
| Row 1 | 0x0500 ... 0x09ff | 1280 bytes |
| Row 2 | 0x0a00 ... 0x0eff | 1280 bytes |
| Row 3 | 0x0f00 ... 0x13ff | 1280 bytes |
| Row 4 | 0x1400 ... 0x18ff | 1280 bytes |
| Row 5 | 0x1900 ... 0x1dff | 1280 bytes |

As shown in Table 1, each row of buffer memory 32 has 1280 bytes, each addressable by a respective hexadecimal address. As known in the art for circular buffers such as buffer memory 32, a particular byte location may be determined by adding an offset to the first byte of a particular row. In the present invention, however, a novel apparatus and method is used to minimize the complexity of the circuitry determining such addresses.

Each address of buffer memory 32 is determined using two parameters: (1) a row pointer which is an integer ranging from 0 to 5 pointing to the current row of buffer memory 32 to be addressed; and (2) a column offset which is an integer ranging from 0 to 1279 pointing to the number of bytes away from the left column for the current byte to be addressed. By multiplying the current row pointer times the number of bytes in each row, and adding the offset to the product, the apparatus determines the current address of any pixel byte within buffer memory 32.

Given Table 1, and the statements above, the result to be achieved is defined by the following Eqn. 1:

$$\text{buffer address} = \text{column pointer} + (\text{row pointer} * 0x500) \qquad \text{Eqn. 1}$$

Given the hexadecimal numbers involved, however, the multiplying and adding solution initially implies a thirteen bit addend and a thirteen bit multiplier. FIG. 8, however, illustrates a more efficient apparatus for achieving the same goal. Particularly, FIG. 8 illustrates a three bit input 49 coupled to a lookup table 50. Lookup table 50 has a five bit output 52 coupled to a first input of a five bit adder 54. FIG. 8 also illustrates the eleven bit column pointer, where the three most significant bits of the eleven bit column pointer are coupled to the second input of adder 54, and the eight least significant bits of the eleven bit column pointer bypass adder 54. In addition, adder 54 provides a five bit output 56. Lastly, the thirteen bit buffer memory address is provided by concatenating the five bits from output 56 as the most significant bits with the eight least significant bits from the column pointer.

With reference to the design of the apparatus of FIG. 8, note from Eqn. 1 that, because of the product times 0x500, the column pointer is always added to a number having two hexadecimal zeroes as its least significant digits (i.e., the last eight bits of the addend are binary zeroes). Consequently, the sum will always have as its last eight bits the last eight bits of the column pointer. Thus, these eight bits need not be added to zero and, therefore, the eight least significant bits of the column pointer bypass the five bit adder, leaving the remaining three most significant bits to be added to the corresponding bits of the product of Eqn. 1.

Lookup table 50 provides a lookup function which achieves the same result as bits 12–8 of the product of Equation 1. Rather than multiplying, however, lookup table 50 is preferably a multiplexer that produces a five bit output depending on the state of its three bit input. Table 2 illustrates the resulting output given the row pointer input.

TABLE 2

| Row pointer | Look up output |
|---|---|
| 000 | 00000 |
| 001 | 00101 |
| 010 | 01010 |
| 011 | 01111 |
| 100 | 10100 |

The five bits of output 56 are then added to the three most significant bits of the column pointer, that is, those three most significant bits are added to the three least significant bits of the five bit output from lookup table 50. The resultant five bit sum is concatenated with the eight least significant bits from the column pointer, thereby creating a thirteen bit buffer address.

In view of the above, note that FIG. 8 demonstrates that the present invention may service a circular memory for processing image data wherein the memory requires a thirteen bit address, but may do so using circuitry far less complex then the combination of a thirteen bit multiplier and thirteen bit adder.

4. Pixel Subset Analysis and Center Pixel Correction Including Specialized Sample Window Another aspect of the present invention includes an improved apparatus and methodology which may be used in conjunction with prior art techniques, or with other aspects of the present invention. Before discussing the novel apparatus and methodology, recall as discussed in connection with FIGS. 3A–3E, the prior art generally uses a five by five bit sample window to encompass a subset of bits. One prior art approach to evaluate the twenty-five bit pattern represented by the bit subset is to input all twenty-five bits into combinational logic, where the logic is pre-coded to identify those patterns requiring correction to their respective center pixel. While the number of gates may be minimized using such an approach, one significant drawback is the inflexibility of hardrwired logic; that is, once the logic is pre-coded, it later cannot be changed without significant costs in time, labor, and money. For example, if it is later decided that a new pattern should be detected, some or all of the combinational logic may require reconfiguration, at a significant cost in resources.

In view of the above, one aspect of the present invention avoids the combinational logic approach, and provides additional benefits such as programmability for changing patterns of interest, reduced hardware size, and flexibility in the size of the sample window without significantly reducing the other benefits.

FIG. 9A illustrates a diagrammatic view of the creation of a sample window 58 in accordance with the present invention. Sample window 58 is preferably used in the previous embodiments in lieu of sample window 38, with additional benefits appreciated by a person skilled in the art from the following discussion.

Sample window 58 is best understood as the combination of two separate windows as shown in FIG. 9A, namely, a vertical sample window 60 and a horizontal sample window 62. In the preferred embodiment, vertical sample window 60 is a five row by three column array; further, note that window 60 is referred to as "vertical" because the pixel subset encompassed by the window gives rise to a vertical orientation (for a non-landscape printing). Similarly, horizontal sample window 62 is a three row by five column array; further, note that window 62 is referred to as "horizontal" because the pixel subset encompassed by the window gives rise to a horizontal orientation (again, for a non-landscape printing). Note, and as illustrated, windows 60 and 62 are overlaid such that the center pixel of each defines the center pixel of the overall sample window 58. In other words, windows 60 and 62 share the same center pixel. Because sample window 58 comprises separately defined windows 60 and 62, sample window 58 will hereafter be referred to as "cumulative window" 58. Note that cumulative window 58 encompasses a total of twenty-one pixels and, thus, is similar to a five by five pixel window (like window 38 of FIG. 6), with the four corner pixels being eliminated.

As demonstrated below, the use of overlaid separate sample windows, each having a common center pixel, creates numerous advantages over a single window when implemented in an anti-aliasing configuration. Recall that one operation of a sample window includes identifying the pattern of pixels included within the window. Toward this end, in the preferred embodiment, for each of the vertical and horizontal windows, fourteen of the fifteen pixel locations encompassed by the respective window (excluding the center pixel as the fifteenth pixel) are concatenated with one another to create a fourteen bit address to a memory. Within the address, each data bit of the address is either a binary one or zero depending on the state (i.e., either black or white) of the pixel corresponding to the bit in the memory address. To illustrate this concept, FIG. 9B illustrates address windows 60a and 62a corresponding to windows 60 and 62, respectively, wherein each location of each window is designated with an address bit position for the respective location. For example, with reference to window 60a, note that its upper left corner is address bit A0, while its lower right corner is address bit A13. Given the designation, each bit is concatenated to form an address using the following convention:

A13 A12 A11 A10 A9 A8 A7 A6 A5 A4 A3 A2 A1 A0

Consequently, if only the upper left corner pixel and the lower right pixel were black, while the remaining thirteen pixels were white, the resulting address would be 10000000000001. Thus, if this exemplary address is received, it is known that the pattern encompassed by vertical window 60 consists of a black pixel in the upper left and lower right pixel locations, with a white pixel in the remaining pixel locations. With this known, data can be stored in a memory which is addressed by the exemplary address, where the data is responsive to the particular address as detailed below. Note also that each bit in window 62 is likewise assigned to a bit within a memory address, with these designations shown as address window 62a in FIG. 9B. The addressing of the memory with the bits of the window is described in greater detail in connection with FIGS. 10A and 10B, below.

Note further that the center pixel of windows 60 and 62 (shown as $cpb_V$ and $cpb_H$) are excluded from the fourteen bit address, and are used for purposes described in detail below. In addition, however, note that a fifteenth bit, A14, is added to the address above as the most significant bit, and bit A14 indicates whether a particular address is coming from vertical window 60 (e.g., bit A14=1) or horizontal window 62 (e.g., bit A14=0). Thus, given the example above, if the bit pattern is in vertical window 60 then the resulting fifteen address is 110000000000001, while if the bit pattern is in horizontal window 62 then the resulting fifteen bit address is 010000000000001. The purpose of the additional A14 bit is also detailed below.

FIG. 10A illustrates a diagram of the preferred circuit 64 which operates during an instance in response to either vertical window 60 or horizontal window 62. Specifically, circuit 64 receives an address from either window 60 or 62, decodes the pattern represented by that address, and outputs a modulated bit sequence if the center pixel represented by that address (and, thus encompassed by cumulative window 58) is to be corrected.

Because circuit 64 operates on only one of vertical or horizontal window 60 or 62 at a time, bit A14 is used as a control signal and, as described above, is a binary zero when the operations pertain to horizontal window 60 and a binary one when the operations pertain to vertical window 62. For example, circuit 64 includes a first multiplexer 66 having two fourteen bit data inputs 66a and 66b. Data inputs 66a and 66b are coupled to receive the fourteen least significant bits of the addresses from vertical window 60 and horizontal window 62, respectively. The control input of first multiplexer 66 is coupled to the A14 bit from windows 60 and 62. Consequently, first multiplexer 66 couples the data at its input 66a to its output in response to a control input of one, and couples the data at its input 66b to its output in response to a control input of zero. For purposes of ease of discussion, this convention is shown in FIG. 10A by placing a "1" on the multiplexer diagram next to input 66a and a "0" on the multiplexer diagram next to input 66b. This convention is followed for the other multiplexers in FIG. 10A as well.

The fourteen bit output of multiplexer 66 is concatenated with bit A14 (as the most significant bit) to form a fifteen bit input to an SRAM 68. SRAM 68 is preferably a 32k by 8 bit SRAM. In operation, SRAM 68 responds to the bit pattern encompassed by window 60 or window 62 (received by SRAM 68 in the form of an address) and initiates a correction to its center pixel if desired. In other words, SRAM 68 is programmed to respond to each of the various different combinations of bit patterns (i.e., addresses) which may be created within the two separate windows of cumulative window 58. If the pattern is one where center pixel correction is desired, then SRAM 68 is programmed to output a code to initiate the appropriate correction. Specifically, SRAM 68 outputs a code in response to the particular pattern of bits within either vertical or horizontal window 60 or 62. The output code causes the center pixel of the pattern at issue to be corrected if desired, or if no correction is required for the center pixel, SRAM 68 likewise outputs a code such that the center pixel is printed in the same state (i.e., black or white) as it appears in memory.

The particular translation provided by SRAM 68 is detailed in connection with FIG. 10B, below. Before proceeding, however, note the improved flexibility provided by SRAM 68. Specifically, recall that one prior art technique uses combinational logic to respond to a bit pattern within a sample window. Once hard-wired, this logic is not easily altered if it is later determined that a given pattern requires a different type of correction. In contrast, by using a programmable device such as SRAM 68, any one or more locations of SRAM 68 are easily re-programmed in order to change the corrective action, if any, taken in response to a corresponding sampled bit pattern. 3O Returning to the apparatus of FIG. 10A, the eight bit output of SRAM 68 is divided and coupled to a second multiplexer 70; more particularly, the four most significant bits (MSBs) of the eight bit output are connected to data input 70a while the four least significant bits (LSBs) of the eight bit output are connected to data input 70b. In other words, for a given eight bit (i.e., one byte) output from SRAM 68, the upper nibble is connected to data input 70a while the lower nibble is connected to data input 70b.

Second multiplexer 70 outputs from one of its two data inputs in response to two parameters, namely, the source of the current address (i.e., either vertical window 60 or horizontal window 62) and the state of the center pixel (i.e., either black or white) of the given source. In this regard, the control input of multiplexer 70 is connected to the output of a third multiplexer 72. The one bit data inputs 72a and 72b of multiplexer 72 are connected to receive the state of the respective center pixel bits (again, labeled cpbV for the vertical window center pixel bit and $cpb_H$ for the horizontal window center pixel bit). The control input of multiplexer 72 is connected to A14 and, thus, multiplexer 72 selects $cpb_V$ if A14 equals 1 (i.e., source window is vertical window 60) and selects $cpb_H$ if A14 equals 0 (i.e., source window is vertical window 62).

As detailed below, the four bit value output by multiplexer 70 forms a part of an address which addresses a dot modulation register ("DMR") storing horizontal 74h and vertical 74v pixel correction values. The choice between the horizontal and vertical pixel correction values depends on whether the vertical or horizontal window 60 or 62 is currently being processed. In this regard, the four bit value output by multiplexer 70 is concatenated with A14 as its most significant bit, thereby creating a five bit address with its most significant bit choosing the corresponding vertical values 74v of DMR 74 for vertical window 60 (i.e., A14=1) and choosing the corresponding horizontal values 74h of DMR 74 for horizontal window 62 (i.e., A14=0). The pixel correction value output by DMR 74 is then serialized to create a bit sequence for the print engine.

FIG. 10B illustrates an example of the operation of FIG. 10A to decode a pattern of bits encompassed by cumulative window 58 and to modulate a new center pixel for that pattern for purposes of printing a corrected center pixel. In FIG. 10B, cumulative window 58 is shown as passing over the same image 10 shown in FIGS. 1A and 3A through 3E. Note, however, that cumulative window 58 differs from the prior art sample window 26 in that the corners of the prior art window are removed, and cumulative window 58 includes two separate windows having a common center pixel.

FIG. 10B particularly illustrates an example of the operation of vertical window 60, with it understood by a person skilled in the art that the operation is similar for horizontal window 62 as readily apparent below. FIG. 10B also illustrates a vertical data window 60b and the corresponding vertical address window 60a (also shown in FIG. 9B). Vertical data window 60b demonstrates that each pixel within the vertical window component of cumulative window 58 is converted either into a binary zero for a white 3O data pixel or a binary one for a black data pixel. Again, given the designation, each bit is concatenated to form fourteen bits of an address using the convention described above. In addition, a most significant bit, A14, is added to the fourteen bits where, again, A14 represents whether the vertical or horizontal window is being processed. In the example of FIG. 10B, vertical window 60 is being processed and, hence, A14=1. Accordingly, the cumulative fifteen bit address is shown in FIG. 10B. Further, in this example, the cumulative fifteen bit address converts to a hexadecimal number of $6412_h$ and, therefore, is referred to hereafter as such.

Figure 1A:
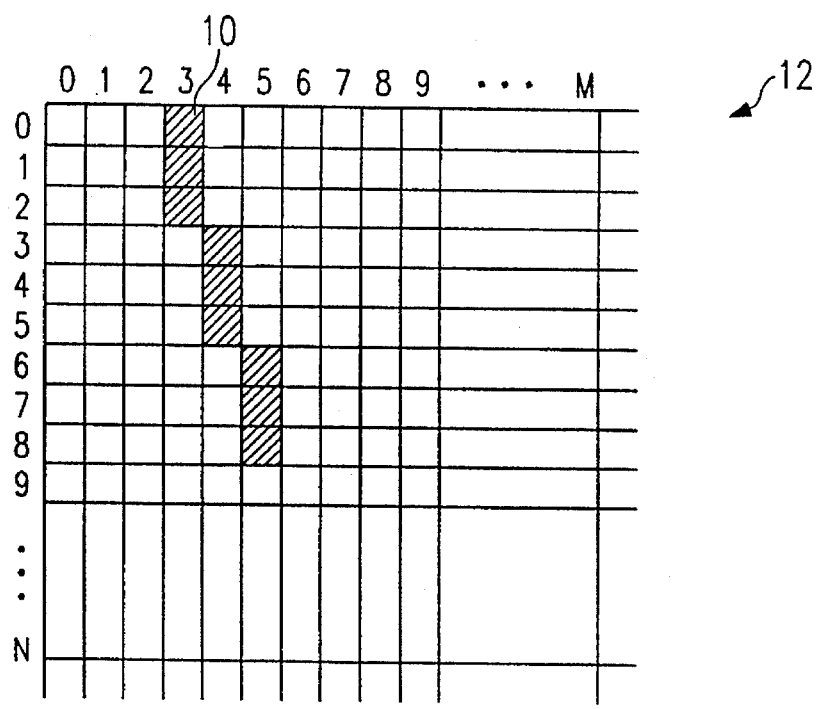
FIG. 1A illustrates a pixel pattern before pixel correction.
Figure 1B:
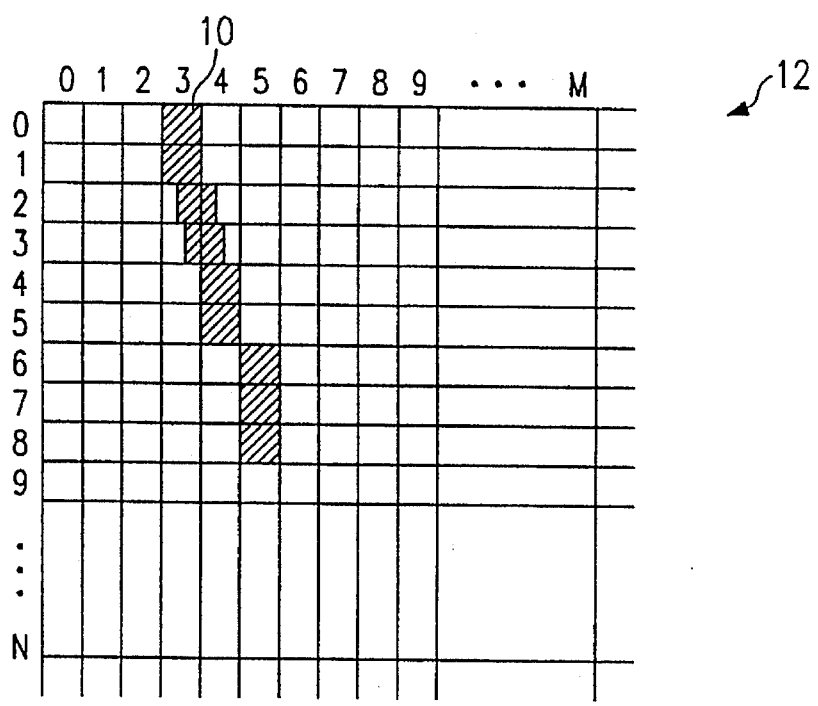
FIG. 1B illustrates the pattern of FIG. 1A after pixel correction is applied to a portion of the pattern.

The cumulative fifteen bit address (e.g., $6412_h$) from vertical window 60b and bit A14 is used to address SRAM 68 (via multiplexer 66 and concatenation with A14). SRAM 68 is pre-programmed to map certain patterns to the appropriate corrective center pixel for those patterns. Specifically, for a given input address (and, therefore, for a given pixel subset pattern), SRAM 68 outputs a byte which, in part, identifies the location of the DMR which stores the appropriate bit sequence for the corrected center pixel corresponding to that address. For this example, recall from the demonstration of image 10 in FIGS. 1A and 1B that it is desirable to change the center pixel (i.e., the pixel at location (2,3)) from a solid black pixel to a right justified ⅝ black pixel. Thus, under the invention shown in FIG. 10B, location $6412_h$ of SRAM 68 is addressed and outputs an upper and lower nibble. The upper nibble of location $6412_h$ is selected by multiplexer 70 because: (1) the source of data is vertical window 60; and (2) the center pixel of that window, $cpb_v$, is black. In this example, the selected upper nibble stores an identifier of register 3 of the vertical window DMR 74v. Note that although the upper nibble of location $6412_h$ is selected (by multiplexer 70), the lower nibble at the same location would be selected if the center pixel bit for the sampled pattern were white.

Once the appropriate nibble is chosen, the four bits of that nibble, in part, identify the appropriate register of either the vertical or horizontal pixel correction values stored in the DMRs. Specifically, these four bits are concatenated with A14 as the fifth, and most significant, bit to address the DMRs. In the current example, A14 equals 1 because the vertical window is being analyzed and, this bit combines with the nibble from memory to address the contents of register 3 of the vertical values stored in the DMRs. Moreover, register 3 of the vertical DMRs stores the bit sequence 00011111 which, as described in connection with FIG. 1B, above, corresponds to the desired right justified ⅝ black pixel. As described in connection with FIG. 5, the group of bits from the selected dot modulation register are then serialized by serial interface circuit 42 and coupled to print engine 24.

Note from the above the particularly efficient and advantageous use of SRAM 68 and DMR correction values 74h and 74v. Specifically, each byte of SRAM 68 is effectively halved by separately addressing the upper or lower nibble in accordance with the state of the center pixel for a given pattern. Specifically, because sixteen DMRs are used per window, only four bits (i.e., $2^4=16$) are necessary to address each individual DMR and, thus, only one nibble per SRAM byte is necessary to store those four bits. Thus, for a 32 k memory, 64 k different patterns may be evaluated since each memory byte can handle two different patterns (a first in the upper nibble and a second in the lower nibble). Moreover, such a configuration allows the use of existing hardware (e.g., 32 k by 8 bit SRAM) rather than requiring a specially made part (e.g., 32 k by 4 bit SRAM) or wasting bits of an existing memory device.

Returning to FIG. 10B, as another example of operation, consider the instance where no change is to be made to the center pixel of the pattern encompassed by the separate windows of cumulative window 58, that is, no center pixel correction is desired. Thus, assume in FIG. 10B that location (2,3) of image 10 is to remain all black (i.e., no correction). In the preferred embodiment, SRAM 68 is programmed to output all zeroes for this no correction event. Thereafter, additional control logic is included (although not shown) to detect the all zero output, thereby recognizing that the center pixel at issue should simply be transmitted on to the print engine without a change in pixel state. In the no correction instance, the control circuit concatenates the center pixel bit, cpb, rather than bit A14, with the output of SRAM 68. Thus, if the center pixel bit is white (i.e., cpb=0), the concatenated address to DMR 74 is 00000, while if the center pixel bit is black (i.e., cpb=1), the concatenated address to DMR 74 is 10000. Given these expected addresses, note in FIG. 10B that location 00000 of DMR 74 stores the bits necessary to print a white pixel while location 10000 stores the bits necessary to print a black pixel. In this example, therefore, the center pixel bit is black and, thus, the appropriate DMR (i.e., location 10000) is addressed to print the center pixel of the pattern in the same state (i.e., black) in which it appears in memory. Consequently, the contents of register 0 (i.e., 11111111) are serialized and output to print engine 24, thereby printing a solid black pixel in the center of the pattern at issue.

As stated above, the examples and illustrations of FIG. 10B apply equally to horizontal sample window 62. Thus, the addresses designated in address window 62a of FIG. 9B are used with the corresponding data encompassed by sample window 62 to couple an address to SRAM 68. Because the horizontal window is at issue, bit A14 of the SRAM address equals 0, thereby addressing the first 16 k of the 32 k SRAM. Again, the upper or lower nibble of the SRAM location is selected based upon the state of the horizontal window center pixel (i.e., black or white), and the selected nibble identifies (in combination with bit A14) the horizontal DMR having the appropriate bit sequence for either correcting, or recreating, the center pixel of the pattern at issue.

Note that in some instances the separate vertical and horizontal analyses may yield conflicting results. For example, the vertical analysis may call for no change to the common center pixel while the horizontal analysis may call for some type of change to the common center pixel. In the preferred embodiment, the vertical analysis takes precedence, that is, given a conflicting determination, the result dictated by vertical window 60 is selected. This preference toward the vertical analysis is chosen because of the control available over a pixel in the horizontal direction, that is, a pixel may be shifted left or right to smooth a vertical line, while there is little (or no) control over the vertical placment of the pixel. Thus, if the two windows present conflicting suggestions, the preferred embodiment defers to the suggestion over which there is more control.

From the above one skilled in the art will appreciate that the inventive center pixel correction apparatus and methodology includes a cumulative sample window comprising partial separate sample windows, with each separate sample sharing the same center pixel. Further, each separate sample window encompasses a number of pixels less than the number of pixels of the cumulative window, thereby allowing separate addressing for each separate window such that hardware requirements are improved while still allowing analysis of a greater number of pixels. (using the span of the cumulative window). For example, and in contrast, if a single window were used to analyze twenty-one bits, then an SRAM having $2^{21}$ locations (2,097,152 locations) would be required rather one with $2^{14}$ as in the preferred embodiment. Given this example, the invention therefore yields a 40:1 reduction in SRAM requirements while still maintaining the same sample window scope.

In addition to the above, while the preferred embodiment has been described in detail, various substitutions, modifications or alterations could be made to the descriptions set forth above without departing from the invention. For example, while vertical and horizontal windows 60 and 62 are described as having reciprocal dimensions (i.e., one being five by three, the other being three by five), an alternative approach would include windows having non-reciprocal dimensions. Thus, vertical window 60 could remain five by three while horizontal window 62 could be three by seven. Other dimensions could likewise be used, so long as the center pixel of each window is the same. As another example, while FIG. 10A sets forth specific circuit functionality, alternatives could be chosen such as changing the size of SRAM 68 or the type of translating element, as well as the number of DMRs or bits within the DMRs. These changes, as well as those readily known or ascertainable to a person skilled in the art, are intended as part of the invention which is defined by the claims set forth below.

5. Toner Saver Apparatus and Methodology

The above description demonstrates the versatility and benefits of the present invention in the context of anti-aliasing, that is, in detecting patterns and correcting the center pixel of that pattern when printing the center pixel. Under another aspect of the present invention, it has been determined that the functionality of anti-aliasing, with some modification, may be altered to save printer toner in various circumstances. Specifically, and as demonstrated by the Figures below, the anti-aliasing circuitry is controlled to detect solid black memory patterns, and output data to the printer such that only the perimeter of those patterns are printed. In other words, the preferred control hollows out the interior area of black regions such that only an outlined pattern is printed. Consequently, the amount of print toner (or other substance dispensed by a printer) is significantly reduced for images which are largely solid black. The FIGS. described below set forth the preferred methodology and apparatus, and demonstrate examples of the results of this aspect of the invention.

Figure 11A:
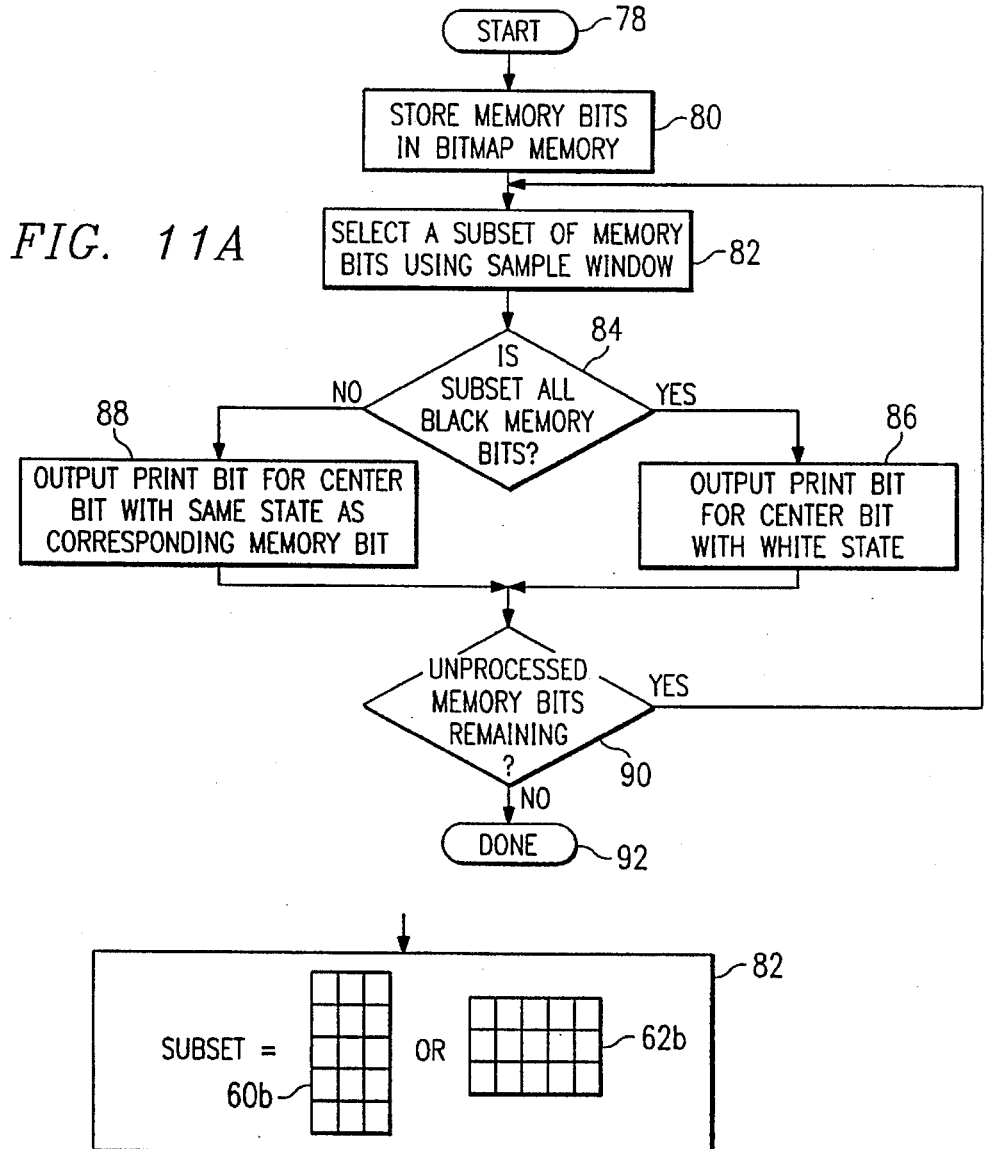
FIG. 11A illustrates a flow chart of the preferred method of the toner saver aspect of the present invention.

FIG. 11A illustrates a flow chart of the preferred method of the toner saver aspect of the present invention. After starting in step 78, step 80 stores a pattern of memory bits in a bitmap memory, such as the bitmap memory 16 discussed in previous sections above. Step 82 selects a subset of the memory bits in bitmap 16 using a sample window. As described in connection with FIG. 11B, below, sample window 58 (with separate vertical and horizontal components) is preferred for selecting this subset of memory bits.

Step 84 determines whether all memory bits in the subset at issue are or are not in the black state, and steps 86 and 88 control the printing of the center pixel of the subset at issue depending on the determination of step 84. Particularly, if all memory bits in the subset at issue are in the black state, the pixel subset at issue represents a solid black region and, thus, it is desirable to hollow out that region. Accordingly, the method continues to step 86 to accomplish the hollowing aspect. Conversely, if one or more of the memory bits in the pixel subset at issue are in the white state, then the subset at issue is not a completely black region and, thus, the method continues to step 88. The alternative paths through either step 86 or step 88 are discussed immediately below.

Step 86, following a determination that the bit subset at issue is all black, outputs a white print bit (i.e., a bit to the printer) representing the center bit of the subset at issue. One skilled in the art will therefore appreciate that, for an all black subset of memory bits, step 86 converts the center bit of that subset to a white bit for purposes of printing. Note that the print bit may be modulated using the DMRs discussed in Section 4, above, or may be communicated as a single indication that a solid white pixel is to be printed.

Step 88, following a determination that the bit subset at issue is not all black, also outputs a print bit representing the center bit of the subset at issue. However, unlike step 86, step 88 does not alter the state of the bit from its form in memory to its print state. Thus, the state of the print bit is the same as the corresponding memory bit, that is, if LB the center bit in memory is black, then the print bit is black and, if the center bit in memory is white, then the print bit is white. Like step 86, the print bit may be modulated using the DMRs discussed in Section 4, above, or may be communicated as a single indication to duplicate the bit in print as its state appears in memory.

Step 90 continues the method and determines whether there are unprocessed memory bits remaining in the bitmap memory. If so, the process returns to step 82 so that a new pixel subset is analyzed. Preferably, this action is accomplished by shifting the sample window to the right (or down, if appropriate) as exemplified in the Figures above. If all bits in the bitmap memory have been processed, the method concludes with step 92.

Figure 11B:
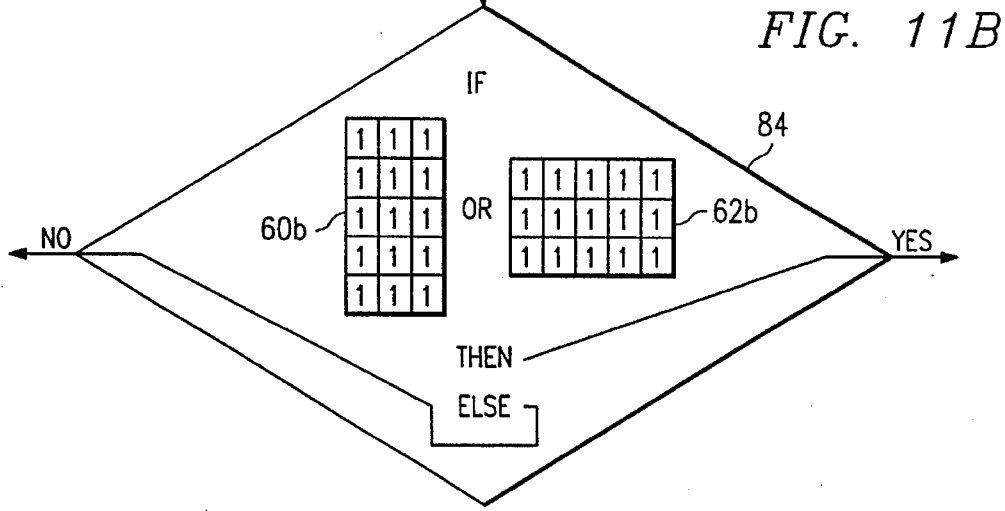
FIG. 11B diagrammatically details the preferred operation of steps 82 and 84 of FIG. 11A.

Having described the overall method, FIG. 11B diagrammatically details the preferred operation of steps 82 and 84. Specifically, in step 82, the subset of memory bits at issue is defined by the components of the cumulative window 58, that is, by vertical and horizontal data windows 60b and 62b, respectively. Thus, the conditional test in step 84 (i.e., whether the pixel subset is all black) is met if either data window 60b or data window 62b includes all binary ones, thereby indicating an all black region within the respective data window. As demonstrated in FIGS. 12A through 13F, below, the use of the separate data windows to define the subset further enhances the hollowing out feature by eliminating interior black pixels which would otherwise be printed using a single square or rectangular sample window.

Figure 12A:
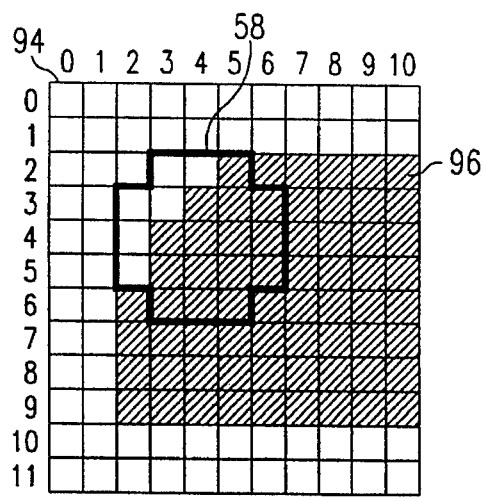
FIGS. 12A–12G illustrate the scanning of a sample window across a plurality of memory locations in a bitmap memory.

FIG. 12A illustrates a plurality of memory locations in a bitmap memory 94. Bitmap memory 94 stores a pattern by including a binary 1 or 0 in each of its respective locations, but for purposes of illustration, each location is either dark or non-dark to illustrate the corresponding cumulative pattern which would be printed if the stored bits are reproduced in a scan direction from left to right along each row of memory 94. Thus, without further processing, pattern 96 would be printed in like fashion on a page. FIG. 12A further includes a sample window 58 which operates to analyze both vertical and horizontal windows 60 and 62, as described above.

Note that only a small portion of memory 94 is shown in FIG. 12A and, hence, only a portion of pattern 96 is also shown. For purposes of the example, however, it is assumed that the darkened pixels along the right border continue to the right so that, although not shown, rows 2 through 9 are darkened to the right of column 10, that is, from column 11 (not shown) to the right edge of the page.

Figure 12B:
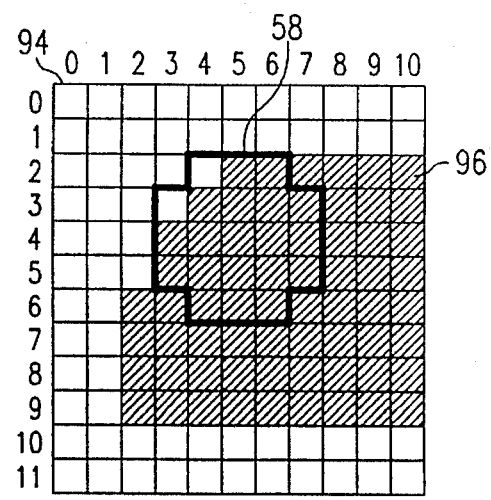
Figure 12C:
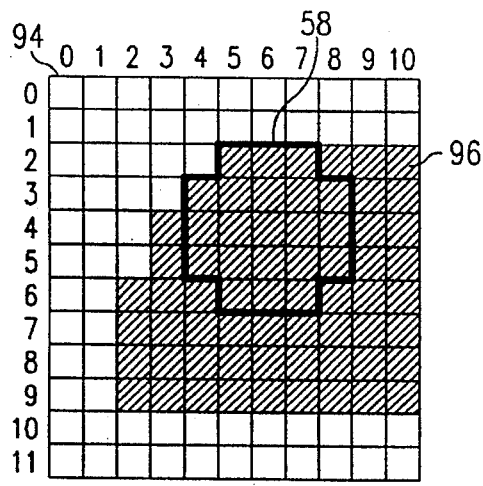
Figure 12D:
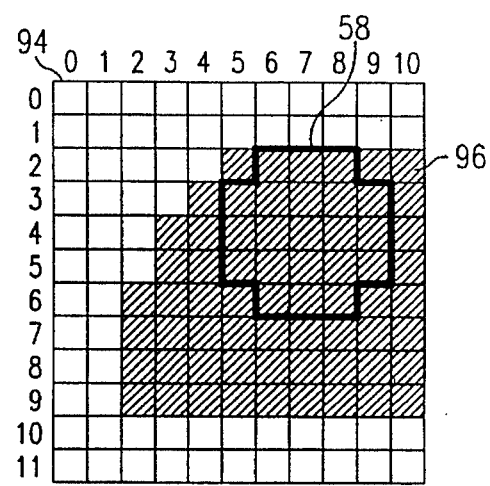
Figure 12E:
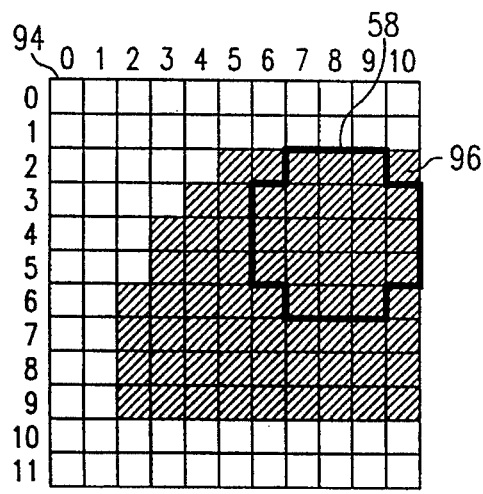
Figure 12F:
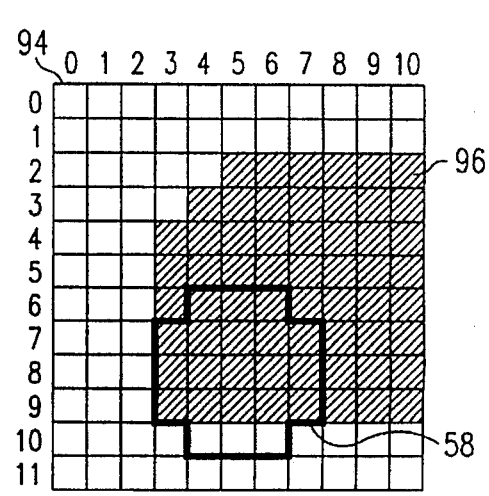
Figure 12G:
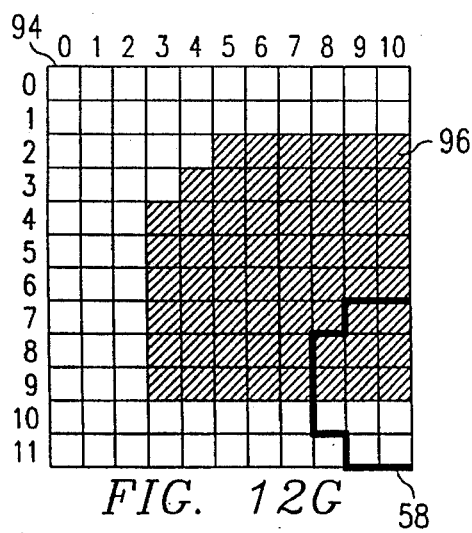
Figure 13A:
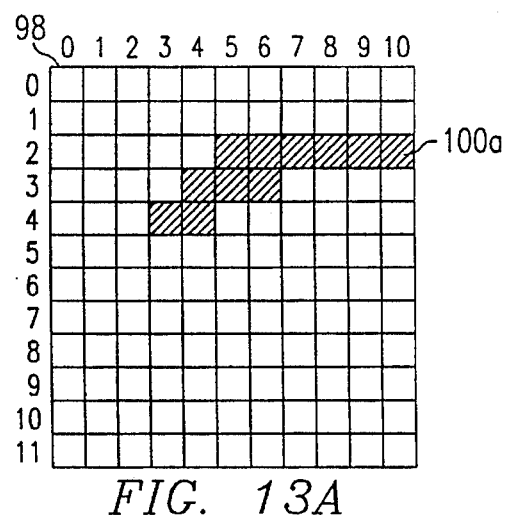
FIGS. 13A–13G illustrate a toner saving printout corresponding to the scanning of the sample window in FIGS. 12A–12G.
Figure 13B:
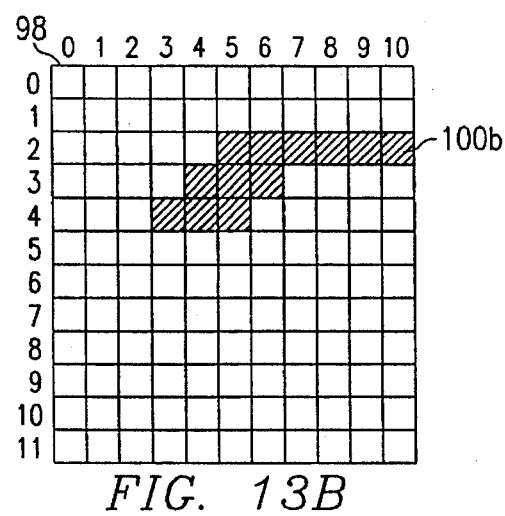

FIG. 13A corresponds to FIG. 12A in that the former illustrates a printed medium such as a page 98, and is subdivided to show pixels corresponding to the data stored in memory 94 of FIG. 12A. FIG. 13A further illustrates a partial printed image 100a representing the print on page 98 after sample window 58 has reached the location shown in FIG. 12A, using the method set forth in FIGS. 11A and 11B. For example, in FIG. 12A, the subset of memory bits encompassed by sample window 58 include at least one white bit. Thus, the state of the center bit (i.e., at location 1.5 (4,4)), namely, the black state, is output for printing and, thus, location (4,4) is black in the corresponding location of partial printed image 100a. In addition to this specific example, note that the other pixels in partial printed image 100a accurately depict the results once sample window 58 has scanned across rows and columns to the location shown in FIG. 12A; particularly, a review of the flow charts of FIGS. 11A and 11b demonstrates that the pixels at locations (2,5–10), (3,4–6), and (4,3–4) have been printed on page 98 in the same state in which they are stored in memory, while the pixels at locations (3,7–10) have been changed from black to white. The remaining examples of FIGS. 12B through 13F further demonstrate the application of the method of FIGS. 11A and 11B.

In FIG. 12B, sample window 58 advances one column to the right when compared to FIG. 12A. In this location, again the subset of memory bits encompassed by sample window 58 includes at least one white bit. Thus, the state of the center bit (i.e., at location (4,5)), namely, the black state, is output for printing and, thus, location (4,5) is black in the corresponding location of partial printed image 100b of FIG. 13S.

In FIG. 12C, sample window advances one column to the right when compared to FIG. 12S. In this location, however, the subset of memory bits encompassed by sample window 58 are all black memory bits. Thus, the state of the center bit (i.e., at location (4,6)), namely, the black state, is effectively changed for printing by outputting a white state and, thus, location (4,6) is white in the corresponding location of partial printed image 100c of FIG. 13C.

Figure 13C:
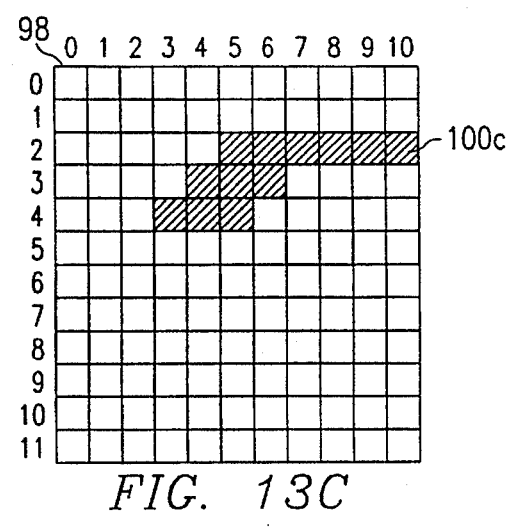
Figure 13D:
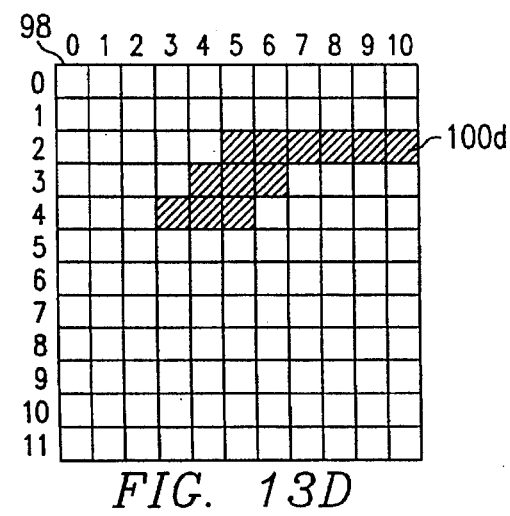
Figure 13E:
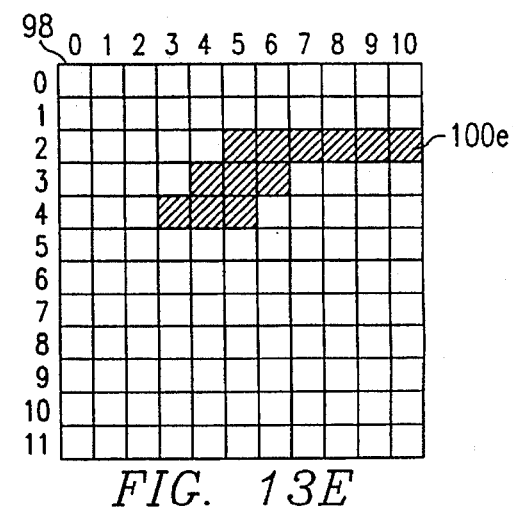

FIGS. 12D and 12E, along with the corresponding FIGS. 13D and 13E, illustrate operation in a fashion similar to FIGS. 12C and 13C. Thus, sample window 58 advances one column to the right when compared to the prior Figure and the subset of memory bits encompassed by sample window 58 are all black memory bits. Thus, the black state of each respective center bit is effectively changed for printing by outputting a white state as shown in the corresponding center locations (i.e., (4,7) and (4,8)) of partial printed patterns 100d and 100e. In addition, as stated above, for the example of FIGS. 12A through 12F it is assumed that the black region extends to the right beyond the area shown. Thus, sample window 58 continues over this area to the right and, consequently, converts the black memory regions to white printed regions for locations (4,9), (4,10), and so forth.

Figure 13F:
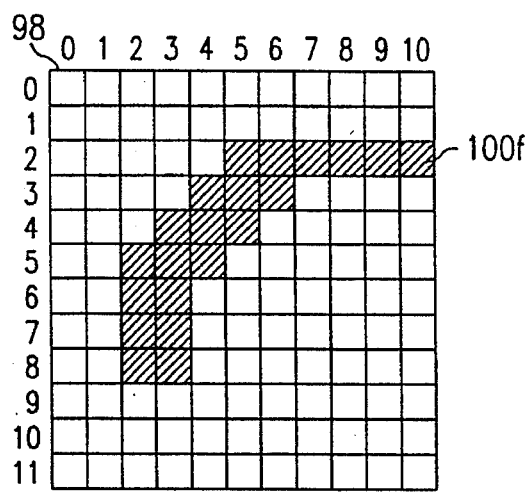

FIGS. 12F and 13F further illustrate the progression of sample window 58 for purposes of hollowing out a darkened region, and also demonstrate one added benefit of the method detailed in FIG. 11B. Specifically, note in FIG. 12F that the entirety of memory bits encompassed by sample window 58 includes three white bits. However, as shown in FIG. 11B, step 84 is satisfied if either horizontal data window 60b or vertical data window 62b are fully black. In FIG. 12F, therefore, although the vertical component of sample window 58 includes white bits, the horizontal component is completely black and thus the condition of step 84 is satisfied. Consequently, the state of the center bit (i.e., at location (8,5)), namely, the black state, is effectively changed for printing by outputting a white state and, thus, location (8,5) is white in the corresponding location of partial printed image 100f of FIG. 13F.

Figure 13G:
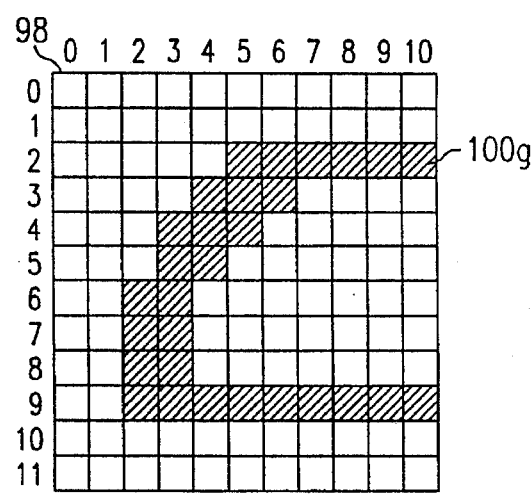

FIGS. 12G and 13G illustrate the completion of the hollowing aspect for pattern 96. Particularly, in FIG. 12G, sample window 58 is shown detecting the last visible black pixel of pattern 96; that is, the black location (9,10) is the center bit of sample window 58. In FIG. 12G, again the subset of memory bits encompassed by sample window 58 include at least one white bit. Thus, the black state of the center bit (i.e., at location (9,10)) is output for printing and, thus, location (9,10) is black in the corresponding location of partial printed image 100g.

Having completed the scanning of pattern 96, note from FIG. 13G the printed image 100g represents an outline of pattern 96 stored in memory 94. Thus, the resource which otherwise would be used to imprint the entire pattern is spared in the hollowed area. In the example of laser printers, this resource translates into a reduction in the amount of toner used. One skilled in the art will therefore appreciate that this aspect of the invention demonstrates an improved technique for outlining or hollowing out a pattern in a given mode of operation. This mode may be termed a draft mode or the like, and is preferably user selectable by the operator of the printer.

In addition to the above, while the preferred toner saver apparatus and methodology has been described in detail, various substitutions, modifications or alterations could be made to the descriptions set forth above without departing from the invention. For example, while the preferred technique is described in connection with the anti-aliasing apparatus set forth above, alternative techniques using other anti-aliasing apparatus (including prior art apparatus) are also beneficial to the extent that a fully darkened pattern is detected and the center bit of that pattern is effectively converted to a white bit.

6. Conclusion

From the above, it may be appreciated that the embodiments of the present invention address numerous aspects involving anti-aliasing apparatus and methodology, each providing various benefits over the prior art. Further, while the embodiments have been described in detail, various examples of substitutions, modifications or alterations have been set forth in the descriptions which are intended as within the invention. As still another example, the embodiments have been described in terms of black and white pixels, but various aspects also may apply to gray-scale or color systems. This, as well as other examples above, demonstrate the flexibility of the invention which is defined by the following claims.

What is claimed is:

1. A method of processing a plurality of bits stored in a first memory and representing an image to be printed by reproducing said bits in a fast scan direction, the method comprising:

reading a plurality of groups from said first memory into a second memory, wherein each of said groups comprises a number of bits greater than one bit and is stored in said second memory in said fast scan direction, and wherein each said group is read one group at a time;

copying a predetermined number of bits from each of said plurality of groups to a sample storage area;

after said copying step, sampling said bits of said copied groups wherein said sampled bits form a pattern having a center bit having a binary state; and after said sampling step:

outputting a print signal representative of said binary state if said pattern does not match a predetermined pattern; and outputting a print signal different than said binary state if said pattern matches a predetermined pattern.

2. The method of claim 1 wherein said copying step comprises:

copying, one at a time, each of said plurality of groups to a working storage area, wherein said working storage area comprises a first number of bit registers arranged in rows and columns, and wherein said groups of bits are copied into said rows in said fast scan direction; and copying, at one time, all of said plurality of groups from said working storage area to a holding storage area.

3. The method of claim 2 wherein said first number of bits is forty bits.

4. The method of claim 2 wherein said holding storage area comprises said first number of bit registers arranged in rows and columns, and wherein said sample storage area comprises a second number of bit registers arranged in rows and columns, wherein said copying step further comprises copying, at one time, a column of said bit registers of said holding storage area to a column of said bit registers of said sample storage area.

5. The method of claim 4 wherein said first number of bits is forty bits and wherein said second number of bits is twenty-five bits.

6. The method of claim 1 wherein said step of copying a predetermined number of bits from each of said plurality of groups to a sample storage area comprises copying five bits from each of said plurality of groups.

7. The method of claim 1 wherein each of said groups consists of eight bits.

8. The method of claim 1 wherein said step of outputting a print signal different than said binary state comprises outputting, over a period equal to one bit time, a series of binary bits such that a pixel is printed in response to any of said binary bits representing a first state and such that a pixel is not printed in response to any of said binary bits representing a second state.

9. The method of claim 8 wherein said outputting step comprises addressing a register in response to said pattern, and wherein said outputting step comprises outputting said series of binary bits from said addressed register.

10. Apparatus for processing a plurality of bits stored in a first memory and representing an image to be printed by reproducing said bits in a fast scan direction, said apparatus comprising:

a second memory for storing a plurality of groups from said first memory, wherein each of said groups comprises a number of bits greater than one bit and is stored in said second memory in said fast scan direction, and wherein each said group is stored from said first memory to said second memory one group at a time;

a sample storage area for copying a predetermined number of bits from each of said plurality of groups to said sample storage area;

control circuitry for sampling said bits of said copied groups wherein said sampled bits form a pattern having a center bit having a binary state, wherein said control circuitry is further operable for:

outputting a print signal representative of said binary state if said pattern does not match a predetermined pattern; and outputting a print signal different than said binary state if said pattern matches a predetermined pattern.

11. The apparatus of claim 10 and further comprising:

a working storage area for copying, one at a time, each of said plurality of groups to said working storage area, wherein said working storage area comprises a first number of bit registers arranged in rows and columns, and wherein said groups of bits are copied into said rows in said fast scan direction; and circuitry for copying, at one time, all of said plurality of groups from said working storage area to a holding storage area.

12. The apparatus of claim 11 wherein said holding storage area comprises said first number of bit registers arranged in rows and columns, and wherein said sample storage area comprises a second number of bit registers arranged in rows and columns, and further comprising circuitry for copying, at one time, a column of said bit registers of said holding storage area to a column of said bit registers of said sample storage area.

13. The apparatus of claim 10 wherein said control circuitry is operable for outputting a print signal different than said binary state by outputting, over a period equal to one bit time, a series of binary bits such that a pixel is printed in response to any of said binary bits representing a first state and such that a pixel is not printed in response to any of said binary bits representing a second state.

14. A chip for coupling between a bitmap memory and a print engine, said bitmap memory storing a plurality of bits representing an image to be printed by reproducing said bits in a fast scan direction to said print engine, said chip comprising:

a first interface for coupling to a buffer memory for storing a plurality of groups from said bitmap memory, wherein each of said groups comprises a number of bits greater than one bit and is stored in said buffer memory in said fast scan direction, and wherein each said group is stored from said bitmap memory to said buffer memory one group at a time;

a sample storage area for copying a predetermined number of bits from each of said plurality of groups to said sample storage area;

control circuitry for sampling said bits of said copied groups wherein said sampled bits form a pattern having a center bit having a binary state, wherein said control circuitry is further operable for:

outputting a print signal to said print engine representative of said binary state if said pattern does not match a predetermined pattern; and outputting a print signal to said print engine different than said binary state if said pattern matches a predetermined pattern.

15. The chip of claim 14 and further comprising a second interface for coupling to a pattern memory, wherein said control circuitry couples an address to said pattern memory, said address representative of said pattern, and wherein said pattern memory outputs data in response to said address to initiate said print signal.

16. The chip of claim 14 and further comprising:

a working storage area for copying, one at a time, each of said plurality of groups to said working storage area, wherein said working storage area comprises a first number of bit registers arranged in rows and columns, and wherein said groups of bits are copied into said rows in said fast scan direction; and a holding storage area for copying, at one time, all of said plurality of groups from said working storage area to said holding storage area.

17. The chip of claim 14 wherein said holding storage area comprises said first number of bit registers arranged in rows and columns, and wherein said sample storage area comprises a second number of bit registers arranged in rows and columns, and further comprising circuitry for copying, at one time, a column of said bit registers of said holding storage area to a column of said bit registers of said sample storage area.

18. The chip of claim 14 wherein said control circuitry is operable for outputting a print signal different than said binary state by outputting, over a period equal to one bit time, a series of binary bits such that a pixel is printed in response to any of said binary bits representing a first state and such that a pixel is not printed in response to any of said binary bits representing a second state.

* * * * *